United States Patent
He et al.

(10) Patent No.: US 12,028,876 B2
(45) Date of Patent: Jul. 2, 2024

(54) ACKNOWLEDGEMENT SIGNALING FOR MULTI-PUSCH AND MULTI-PDSCH SCHEDULING

(71) Applicant: APPLE INC., Cupertino, CA (US)

(72) Inventors: Hong He, Cupertino, CA (US); Chunhai Yao, Beijing (CN); Chunxuan Ye, San Diego, CA (US); Dawei Zhang, Cupertino, CA (US); Haitong Sun, Cupertino, CA (US); Huaning Niu, Cupertino, CA (US); Oghenekome Oteri, San Diego, CA (US); Seyed Ali Akbar Fakoorian, San Diego, CA (US); Sigen Ye, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,302

(22) PCT Filed: May 10, 2021

(86) PCT No.: PCT/CN2021/092690
§ 371 (c)(1),
(2) Date: Sep. 15, 2021

(87) PCT Pub. No.: WO2022/236550
PCT Pub. Date: Nov. 17, 2022

(65) Prior Publication Data
US 2024/0040582 A1  Feb. 1, 2024

(51) Int. Cl.
*H04W 72/232* (2023.01)
*H04L 1/1829* (2023.01)
(Continued)

(52) U.S. Cl.
CPC ......... *H04W 72/232* (2023.01); *H04L 1/1854* (2013.01); *H04L 1/1887* (2013.01); *H04W 72/12* (2013.01)

(58) Field of Classification Search
CPC .. H04W 72/232; H04W 72/12; H04L 1/1854; H04L 1/1887
See application file for complete search history.

(56) References Cited

U.S. PATENT DOCUMENTS 10,716,133 B2 * 7/2020 Chatterjee ............. H04L 5/0053
2014/0328260 A1 * 11/2014 Papasakellariou .... H04W 72/23
370/329
(Continued)

FOREIGN PATENT DOCUMENTS

CN  110535610 A  12/2019
CN  112335198 A  2/2021
(Continued)

OTHER PUBLICATIONS

Nokia, Nokia Shanghai Bell, "PDSCH/PUSCH enhancements", R1-2102562, 3GPP TSG RAN WG1 #104bis-e, e-Meeting, Agenda Item 8.2.5, Apr. 12-20, 2021, 29 pages.
(Continued)

*Primary Examiner* — Kashif Siddiqui
(74) *Attorney, Agent, or Firm* — Dorsey & Whitney LLP

(57) ABSTRACT

Systems and methods disclosed herein relate to acknowledgement signaling sent by a user equipment (UE) in response to downlink control information (DCI) received from a base station that schedules the use of multiple physical uplink control channels (multi-PUSCH) or multiple physical downlink control channels (multi-PDSCH). Acknowledgement signaling may inform the base station that DCI scheduling the multi-PUSCH/multi-PDSCH was received (or not), so that the base station may reclaim those scheduled resources in the case that the UE remains unaware
(Continued)

of them. Methods for performing this signaling include, e.g., the use of HARQ-ACK codebooks (whether in a semi-static or dynamic manner), and aperiodic sounding reference signals (A-SRS). Embodiments involving such DCI received across multiple component carriers of different serving cells of the UE are contemplated. Acknowledgment signaling according to multi-PUSCH/multi-PDSCH subgroups, monitoring windows, acknowledgment signaling enablement/ disablement, and the use of DCI to trigger acknowledgment signaling are also discussed.

19 Claims, 22 Drawing Sheets

(51) Int. Cl.
  *H04L 1/1867* (2023.01)
  *H04W 72/12* (2023.01)

(56) References Cited

U.S. PATENT DOCUMENTS

| | | | |
|---|---|---|---|
| 2018/0035242 A1 | 2/2018 | Yi | |
| 2018/0092083 A1 | 3/2018 | Agarwal et al. | |
| 2018/0368137 A1* | 12/2018 | Yin | H04L 5/0091 |
| 2019/0045533 A1* | 2/2019 | Chatterjee | H04L 5/0053 |
| 2019/0103954 A1* | 4/2019 | Lee | H04L 5/0098 |
| 2019/0254045 A1 | 8/2019 | Sadiq et al. | |
| 2019/0380141 A1 | 12/2019 | Gupta et al. | |
| 2020/0154467 A1 | 5/2020 | Gong et al. | |
| 2020/0196333 A1 | 6/2020 | Lin | |
| 2020/0313809 A1* | 10/2020 | Park | H04L 1/1861 |
| 2021/0050973 A1 | 2/2021 | Kwon et al. | |
| 2021/0051690 A1* | 2/2021 | He | H04L 1/1822 |
| 2021/0144743 A1 | 5/2021 | Rastegardoost et al. | |
| 2021/0184800 A1* | 6/2021 | Zhou | H04B 7/063 |
| 2021/0266876 A1* | 8/2021 | Zhou | H04L 1/1887 |
| 2022/0210816 A1 | 6/2022 | Wu et al. | |
| 2022/0256543 A1* | 8/2022 | Tian | H04L 5/0091 |
| 2023/0030756 A1 | 2/2023 | Zhang et al. | |
| 2023/0217450 A1 | 7/2023 | He et al. | |

FOREIGN PATENT DOCUMENTS

| | | |
|---|---|---|
| EP | 4228366 A1 | 8/2023 |
| WO | 2020141994 A1 | 7/2020 |
| WO | 2020204637 A1 | 10/2020 |

OTHER PUBLICATIONS

PCT/CN2021/092690, International Search Report and Written Opinion, Feb. 11, 2022, 9 pages.
ZTE, Sanechips, "Remaining issues on scheduling and HARQ for NR-U", R1-1911824, 3GPP TSG RAN WG1 Meeting #99, Reno, Nevada, USA, Agenda Item 7.2.2.2.3, Nov. 18-22, 2019, 11 pages.
U.S. Appl. No. 17/593,299, Non-Final Office Action, filed Dec. 20, 2023, 11 pages.
Lenovo, Motorola Mobility, "Potential enhancement to DCI based power saving adaptation", #R1-2005936, 3GPP TSG RAN WG1 Meeting #102-e, e-Meeting, Agenda Item 8.7.2, Aug. 17-28, 2020, 3 pages.
PCT/CN2021/092741, International Search Report and Written Opinion, Feb. 10, 2022, 9 pages.

* cited by examiner

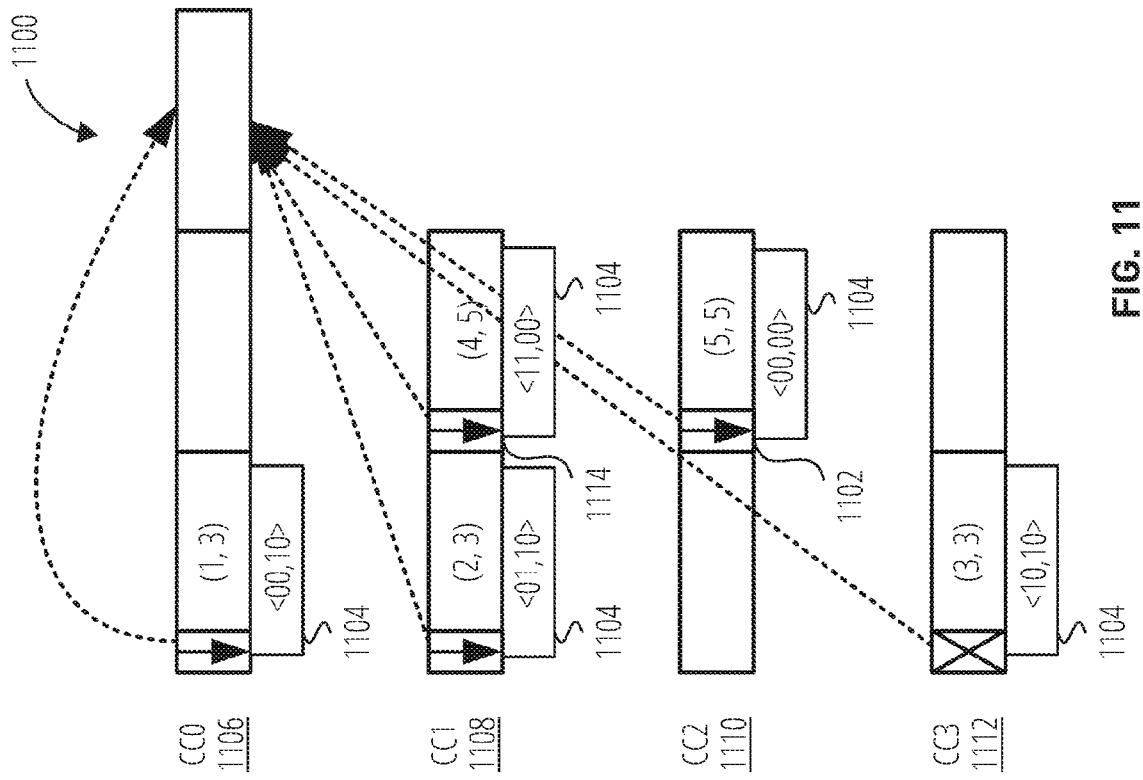

ACKNOWLEDGEMENT SIGNALING FOR MULTI-PUSCH AND MULTI-PDSCH SCHEDULING

TECHNICAL FIELD

This application relates generally to wireless communication systems, including the use of downlink control information (DCI) that schedules multiple shared channels.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 illustrates the contents of a DCI IE of DCI sent according to the use of a dynamic HARQ-ACK codebook, according to an embodiment.

FIG. 11 illustrates signaling using modulo operation for C-MDAI field and T-MDAI field use in an M-DCI, according to an embodiment.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Physical uplink shared channels (PUSCH) and/or physical downlink control channels (PDSCH) may be used in a RAN between a base station and a UE for uplink or downlink communications respectively. In some RANs, PUSCH and/or PDSCH may be scheduled by downlink control information (DCI) sent by the base station to a UE on a physical downlink control channel (PDCCH).

It is contemplated that some RANs may operate in relatively high frequencies. For example, an NR RAN may operate with frequencies of up to 71 GHz. In these (and other) cases, it may be advantageous to use a single DCI to schedule multiple PUSCH (multi-PUSCH) or multiple PDSCH (multi-PDSCH). This multi-PUSCH or multi-PDSCH as scheduled by a single DCI may reduce control signaling overhead within the RAN as compared to the case where each PUSCH/PDSCH is instead individually scheduled by a corresponding DCI. In this disclosure, a DCI that schedules a multi-PUSCH or a multi-PDSCH may be referred to as an M-DCI, while a DCI that schedules only a single PUSCH or PDSCH may be referred to as an S-DCI.

A DCI that is used for scheduling for PUSCH/PDSCH/multi-PUSCH/multi-PDSCH may be received at the UE in a monitoring occasion (MO) that is consistent with a search space configuration at provided to a UE (and perhaps consistent with base station provided parameters, as will be explained). Further, when a UE uses carrier aggregation (CA) with multiple component carriers (CCs), a DCI may be received on a CC that has the MO for that DCI.

Figure 1:
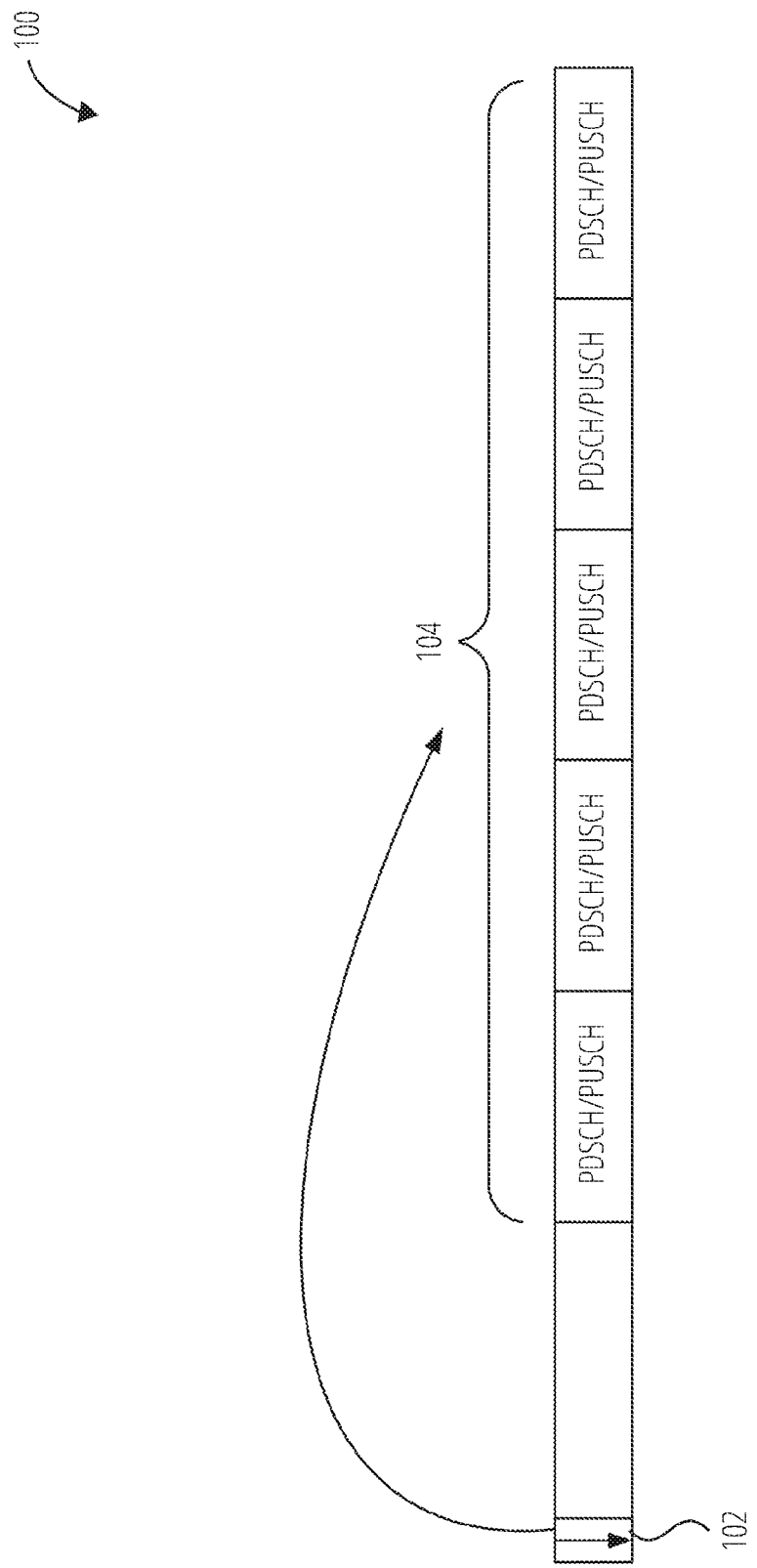
FIG. 1 illustrates signaling for using M-DCI to schedule a multi-PUSCH or a multi-PDSCH, according to an embodiment.

FIG. 1 illustrates signaling 100 for using M-DCI 102 to schedule a multi-PUSCH or a multi-PDSCH, according to an embodiment. A base station may send the M-DCI 102 to a UE. The M-DCI 102 schedules the multi-PUSCH or multi-PDSCH 104 as between the base station and the UE, such that the UE is informed of the timing of the multi-PUSCH or multi-PDSCH 104 (as illustrated).

Due to interference, low signal power, radio channel fast fading, or other reasons, a DCI sent by the base station to the UE may be missed at the UE. Accordingly, the UE may be unaware of any resources scheduled by the DCI. These resources are accordingly not used by the UE to perform transmissions with/receive transmissions from the base station (and in this sense are wasted). In the case where a DCI schedules only a single PUSCH/PDSCH, it may be that this circumstance can be acceptable if it is not frequent. However, in cases where M-DCI is missed at the UE, the amount of wasted resources is greater than in the single scheduled PUSCH/PDSCH case, to the extent that any resulting system degradation/spectrum efficiency impacts due to the wasting of such resources is less acceptable to the operator of the RAN.

Figure 2:
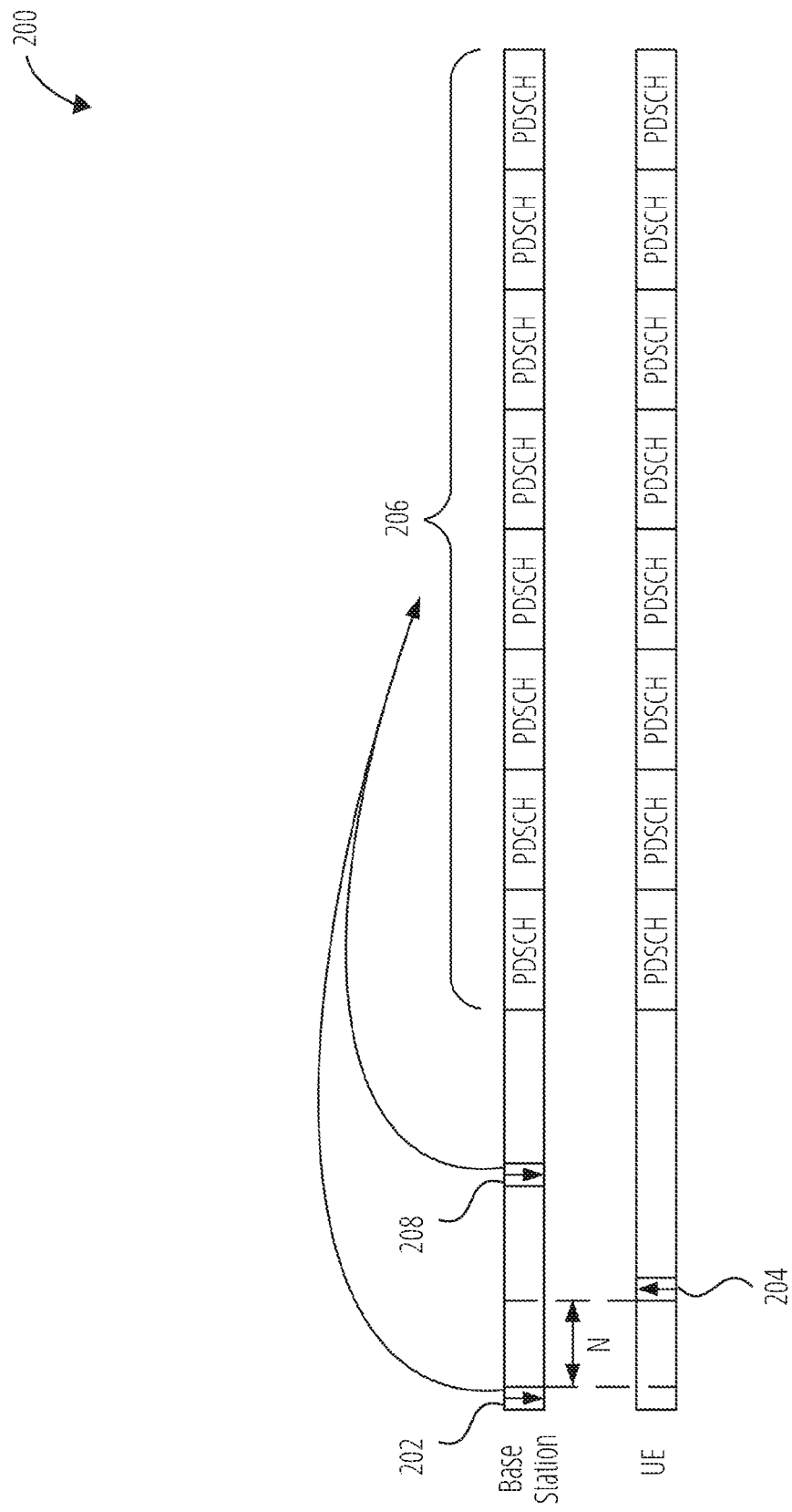
FIG. 2 illustrates signaling where a UE confirms multi-PUSCH or multi-PDSCH scheduled by an M-DCI by using acknowledgement signaling, according to an embodiment.

FIG. 2 illustrates signaling 200 where a UE confirms multi-PUSCH or multi-PDSCH scheduled by an M-DCI 202 by using acknowledgement signaling 204, according to an embodiment. In the embodiment of FIG. 2, the base station sends the M-DCI 202 to a UE to schedule the illustrated multi-PDSCH 206. Note that the multi-PDSCH 206 could instead be a multi-PUSCH in other embodiments.

In response to the M-DCI 202, the UE sends the acknowledgement signaling 204 to the base station. This acknowledgement signaling 204 indicates to the base station that the M-DCI 202 was received at the UE. In some cases, the UE may be expected to provide the acknowledgement signaling 204 sometime at or after N symbols from the last symbol of a PDCCH providing the M-DCI 202 (as will be described in further detail below). Upon receipt of the acknowledgement signaling 204, the base station can be sure that there is a joint or aligned understanding between the UE and the base station about the existence and timing of the multi-PDSCH 206. Accordingly, the base station proceeds with the multi-PDSCH 206 as planned (and, as illustrated, the UE is correctly aligned to the multi-PDSCH 206 as well).

In the case that the acknowledgement signaling 204 has not been sent by the UE (or had it not been properly received at the base station), the base station may have instead canceled any transmission(s) on the multi-PDSCH 206 (in order to not waste the resources of the multi-PDSCH 206, due to the unconfirmed/un-acknowledged receipt of the M-DCI 202 at the UE).

It is contemplated that the acknowledgement signaling 204 can take one or more of a variety of forms. For example, the acknowledgement signaling 204 may be indicated by using uplink signals corresponding to the M-DCI 202, and/or the acknowledgement signaling 204 may include hybrid automatic repeat request (HARQ) acknowledgement (HARQ-ACK) signaling (over physical uplink control channel (PUCCH)) and/or aperiodic sounding reference signal (A-SRS) signaling, as will be further detailed below.

FIG. 2 also illustrates the C-DCI 208. The C-DCI 208 may be sent by the base station to the UE after the receipt at the base station of the acknowledgement signaling 204 in order to confirm that the multi-PDSCH 206 (or, in other embodiments, the multi-PUSCH) as scheduled in the M-DCI 202 is still going forward. For example, the UE may not be expected to receive the multi-PDSCH 206 in the case where the M-DCI 202 is received at the UE but the C-DCI 208 is not. This aspect allows the base station to cancel the multi-PDSCH 206 (or the multi-PUSCH) if, for example, latency sensitive traffic arrives after the M-DCI 202 is sent. The C-DCI 208 may be a UE-specific DCI format, or it may be a group-common DCI format used to re-confirm the M-DCI 202 paired with C-DCI 208.

Figure 3:
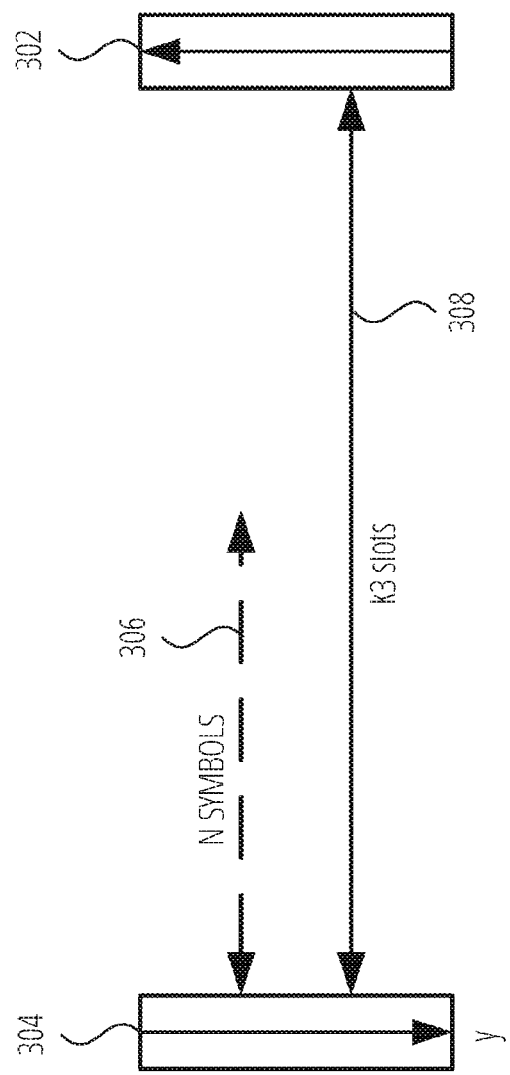
FIG. 3 illustrates an embodiment where acknowledgement signaling using HARQ-ACK signaling in PUCCH is sent in response to an M-DCI, according to an embodiment.

FIG. 3 illustrates an embodiment where acknowledgement signaling 302 using HARQ-ACK signaling in PUCCH is sent in response to an M-DCI 304, according to an embodiment. As illustrated, the acknowledgement signaling 302 may be sent sometime after a first duration 306 of N symbols from the last symbol of a PDCCH conveying the M-DCI 304.

In some designs, the value of N may be defined corresponding to a subcarrier spacing (SCS) of the PDCCH. Further, it may be that multiple sets of values of N may be predetermined (e.g., according to a specification for the wireless communication system) and selected according to a UE capability. For example, for a UE with capability 1, the value of N may be 5 when $\mu$ (an index for the PDCCH SCS)=0 (SCS=15 kHz); the value of N may be 5.5 when $\mu$=1 (SCS=30 kHz); and the value of N may be 11 when $\mu$=2 (SCS=60 kHz). For a UE with capability 2, the value of N may be 10 when $\mu$=0; the value of N may be 12 when $\mu$=1; the value of N may be 22 when $\mu$=2; and the value of N may be 25 when $\mu$=3 (SCS=120 kHz).

In whichever case, when the UE detects the M-DCI 304, it generates the acknowledgement signaling 302 in a PUCCH in slot y+$k_3$, where y is a slot in which the M-DCI 304 is received, and $k_3$ is a number of slots of a second duration 308 that when measured from y, arrives at the slot of the acknowledgement signaling 302. In some cases, a set of $k_3$ values may be configured by radio resource control (RRC) signaling, and one of the configured values is further indicated by a PDSCH-to-HARQ_feedback timing indicator field in the M-DCI 304. In other cases, a single $k_3$ value for use by the UE may be pre-determined/pre-configured at the UE (e.g., according to a specification for the wireless communication system) for HARQ-ACK feedback to acknowledge the reception of M-DCI. In some of these embodiments, $k_3$ may be equal to 1.

In some embodiments, a multi-PUSCH or a multi-PDSCH scheduled by an M-DCI may be split into L subgroups (with L≥2). This structure may allow a base station to cancel the use of second (and any subsequent) subgroups of the multi-PUSCH/multi-PDSCH if acknowledgement signaling corresponding to the first subgroup is not received. The size of each subgroup may be configured by RRC signaling, may be predetermined according to a specification defining the operation of the wireless communication system, or it may be dynamically signaled in the M-DCI 402 (e.g., according to a preconfigured set of options provided to the UE by RRC signaling).

Figure 4:
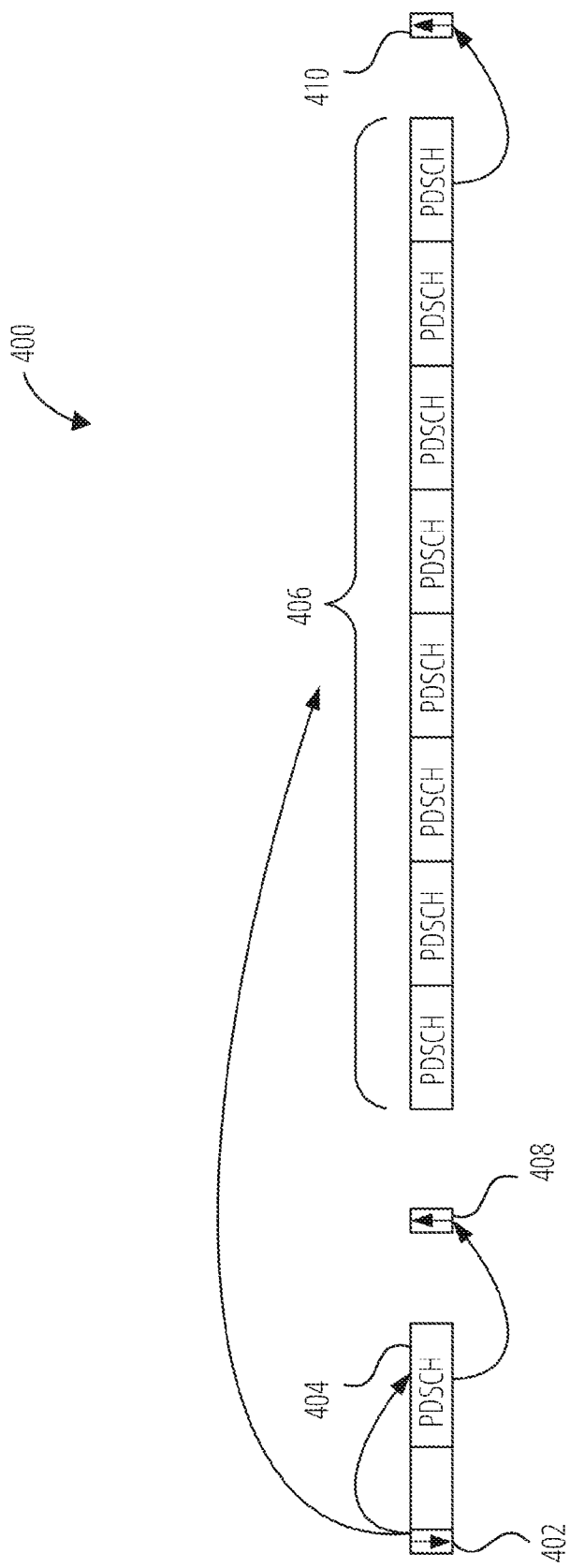
FIG. 4 illustrates signaling corresponding to an M-DCI that schedules a multi-PDSCH comprising a first subgroup and a second subgroup, according to an embodiment.

FIG. 4 illustrates signaling 400 corresponding to an M-DCI 402 that schedules a multi-PDSCH comprising a first subgroup 404 and a second subgroup 406, according to an embodiment. The UE receives the M-DCI 402 and accordingly is informed of the timing of the first subgroup 404 and the second subgroup 406. The UE sends HARQ-ACK signaling in the PUCCH 408 in response to the data received on a PDSCH of the first subgroup 404, and this occurs prior to the time of the second subgroup 406. Accordingly, this HARQ-ACK signaling acts as acknowledgement signaling to the base station that indicates that the M-DCI 402 was received at the UE, in that the such signaling has confirmed the UE's use (and therefore knowledge) of resources (the first subgroup 404) that were scheduled by the M-DCI 402.

The system then proceeds with the use of the PDSCH of the second subgroup 406 as between the UE and the base station, including the use of the PUCCH 410 including HARQ-ACK signaling for the one or more PDSCH of the second subgroup 406.

In the case that the HARQ-ACK signaling corresponding to the first subgroup 404 is not received at the base station from the UE on the PUCCH 408, the network may conclude that the M-DCI 402 was not actually received at the UE. The resources of the second subgroup 406 may then instead be concealed by the base station and re-scheduled to other UEs. This keeps the resources of the second subgroup 406 from being wasted in the case that the M-DCI 402 was not properly received at the UE.

In some embodiments, the UE may be provided PDSCH-to-HARQ_feedback timings and PUCCH resource index (PRI) for each of the PDSCH subgroups by separate fields in an M-DCI. In other embodiments, a single PDSCH-to-HARQ_feedback timing and one PRI may be provided in the M-DCI and commonly applied to each of the subgroups relative to the final PDSCH in the respective subgroup.

Figure 5:
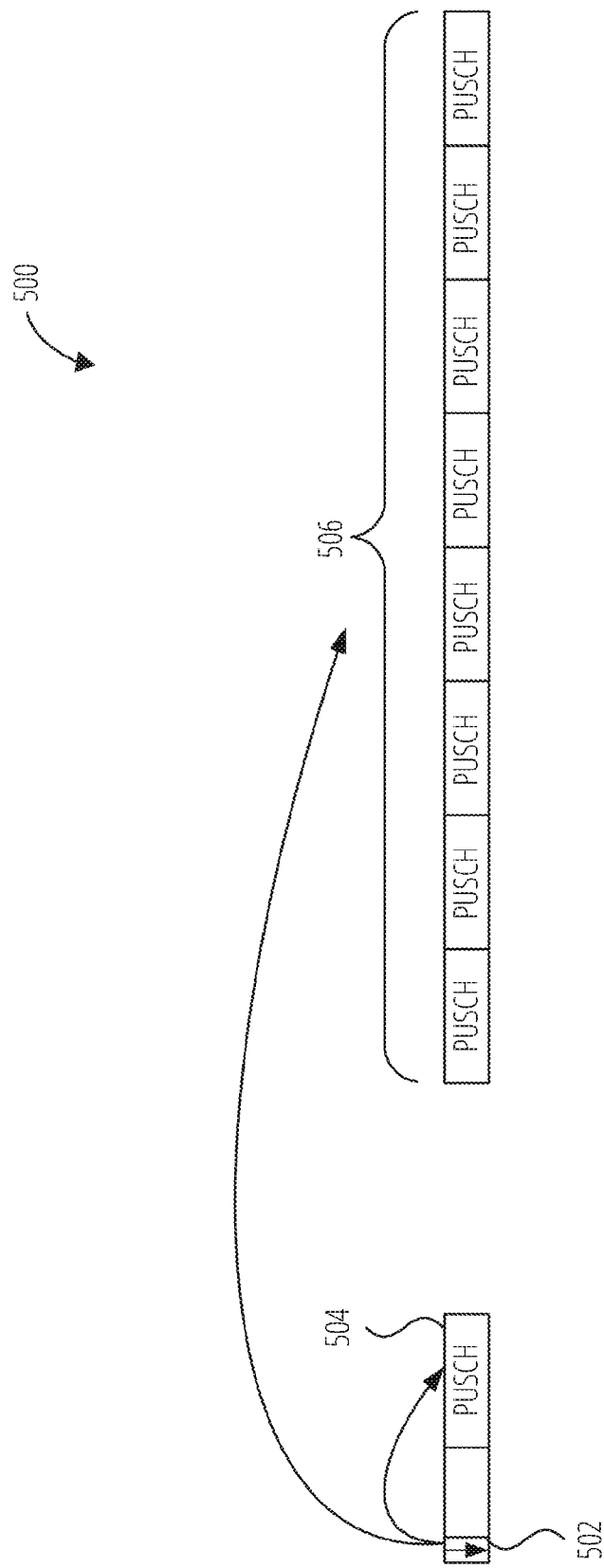
FIG. 5 illustrates signaling corresponding to an M-DCI that schedules a multi-PUSCH comprising a first subgroup and a second subgroup, according to an embodiment.

FIG. 5 illustrates signaling 500 corresponding to an M-DCI 502 that schedules a multi-PUSCH comprising a first subgroup 504 and a second subgroup 506, according to an embodiment. The UE receives the M-DCI 502 and accordingly is informed of the timing of the first subgroup 504 and the second subgroup 506. The UE accordingly sends data on a PUSCH of the first subgroup 504 consistent with this information. This PUSCH signaling acts as acknowledgement signaling to the base station that indicates that the M-DCI 502 was received at the UE, in that the such signaling represents the UE's use (and therefore knowledge) of resources (the first subgroup 504) that were scheduled by the M-DCI 502.

The system then proceeds with the use of the PUSCH of the second subgroup 506 as between the UE and the base station.

In the case that data is not received at the base station from the UE on a PUSCH of the first subgroup 504, the network may conclude that the M-DCI 502 was not actually received at the UE. The resources of the second subgroup 506 may then instead be concealed by the base station and re-scheduled to other UEs. This keeps the resources of the second subgroup 506 from being wasted in the case that the M-DCI 502 was not properly received at the UE.

In some embodiments, a semi-static HARQ-ACK codebook may be used to acknowledge the receipt of one or more received M-DCI to the base station. Note that in some embodiments, as discussed above, these M-DCI may be transmitted on multiple CCs, in the case that the UE is so configured. The codebook may be sent on a PDCCH occurring during a slot n. In this circumstance, the UE may determine a set of MO corresponding to one or more search space configuration(s) provided to the UE by the base station and which that also that correspond to slot(s) according to $n-k_3$, where a set of one or more $k_3$ values is provided by RRC signaling for the serving cell(s) of the UE. Then, (in some embodiments) the UE generates the codebook corresponding to these MO in an ascending order of serving cell/component carrier index (if applicable) and then in descending order of the slot timing value in the set of $k_3$ for the serving cell (other possible orderings are contemplated). In other words, the codebook is organized into subsets according to serving cell/component carrier index (if applicable), and then the bits of each such subset are ordered according to descending order of the applicable $k_3$ for the respective bits. Note that the UE does not include HARQ-ACK information for a slot $n-k_3$ in the codebook if that location is not indicated in the one or more search space configurations (and thus it can be said that there is no MO at that time and on that CC, as will be further shown below).

In the codebook, the UE reports ACK values (e.g., a bit "1") for each MO for which a corresponding M-DCI is detected, otherwise a negative acknowledgement (NACK) value (e.g., a bit "0") is reported for each MO during which a corresponding M-DCI was not detected.

Figure 6:
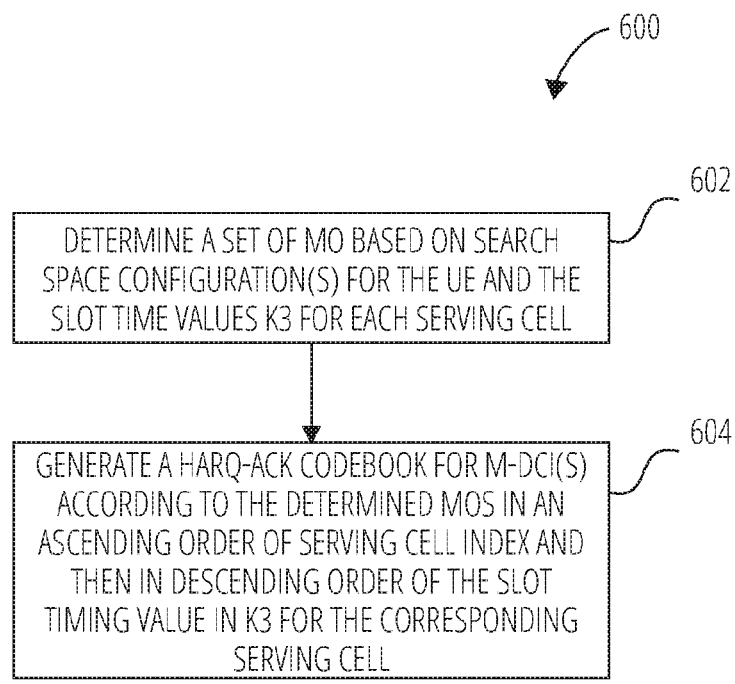
FIG. 6 illustrates a method of generating a semi-static HARQ-ACK codebook to acknowledge receipt of M-DCI, according to an embodiment.

FIG. 6 illustrates a method 600 of generating a semi-static HARQ-ACK codebook to acknowledge receipt of M-DCI, according to an embodiment. The method 600 includes determining 602 a set of MOs based on search space configuration(s) for the UE and the slot time values $k_3$ for each serving cell.

The method 600 further includes generating 604 a HARQ-ACK codebook for M-DCI(s) according to the determined MOs in an ascending order of serving cell/component carrier index and then in descending order of the slot timing value in $k_3$ for the corresponding serving cell.

Figure 7:
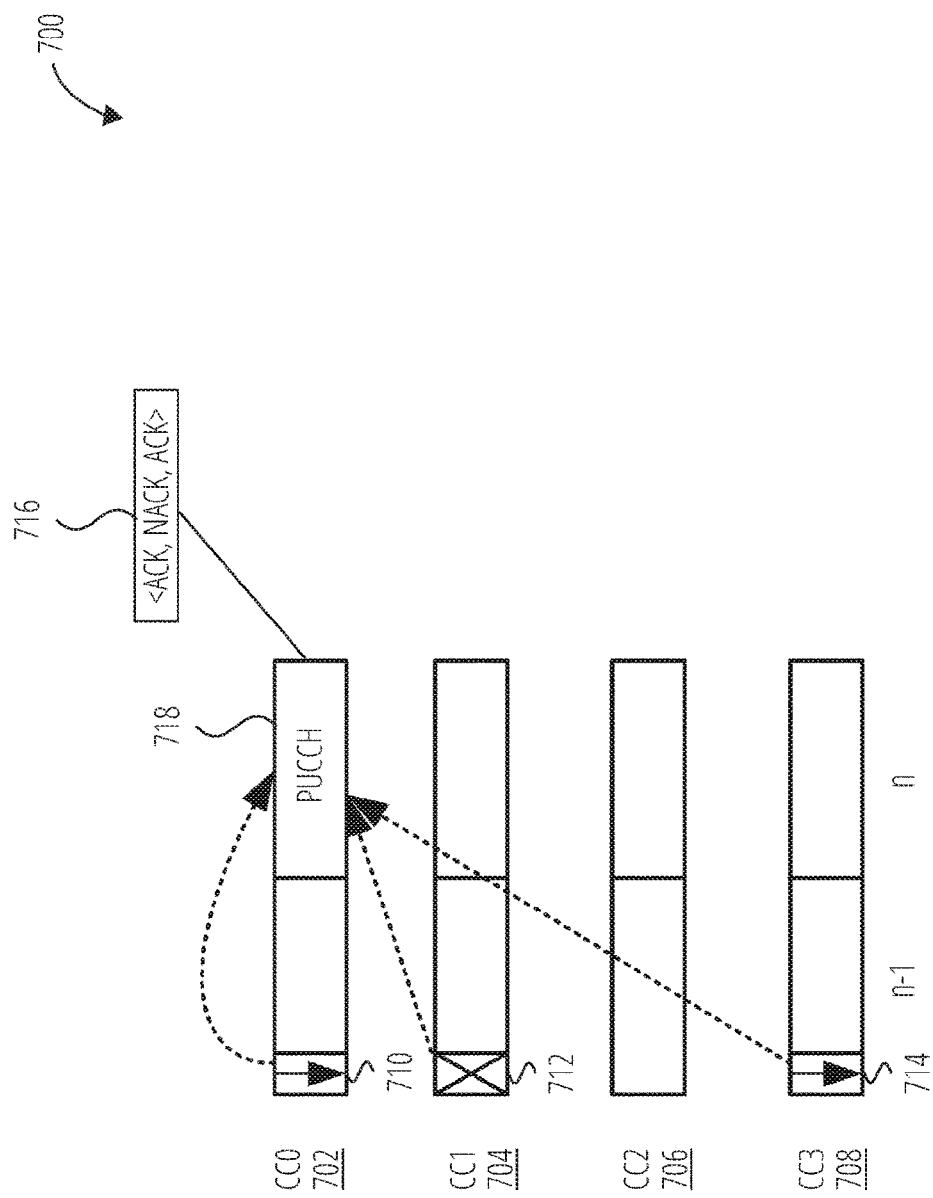
FIG. 7 illustrates signaling according to a use of a semi-static HARQ-ACK codebook to acknowledge receipt of M-DCI, according to an embodiment.

FIG. 7 illustrates signaling 700 according to a use of a semi-static HARQ-ACK codebook to acknowledge receipt of M-DCI, according to an embodiment. FIG. 7 illustrates that a UE uses four CCs, including the CC0 702, the CC1 704, the CC2 706, and the CC3 708. Further, the example of FIG. 7 presumes the UE has been configured with use of $k_3=1$. The UE then uses this $k_3$ information to determine the locations of various MO across the CC0 702, CC1 704, CC2 706, and CC3 708 according search space configuration(s) for the UE. For example, the search space configurations respective to each of CC0 702, CC1 704, and CC3 708 may allow for an MO occurring on CC0 702 during a slot corresponding to a first M-DCI 710, an MO occurring on CC1 704 during a slot corresponding to a failure 712 to receive any M-DCI, and an MO occurring on CC3 708 corresponding to a second M-DCI 714). Further the search space configuration for CC2 706 may not allow for an MO during slot n−1.

In the signaling 700, the UE generates an ACK corresponding to a successful receipt of the first M-DCI 710 during an MO on the CC0 702, a NACK corresponding to the failure 712 to receive any M-DCI during an MO on the CC1 704, and an ACK corresponding to a successful receipt of the second M-DCI 714 during an MO on the CC3 708.

The ACK for the first M-DCI 710, NACK corresponding to the failure 712, and the ACK for the second M-DCI 714 may accordingly be considered acknowledgement signaling. Note that because there was no MO associated with the CC2 706, no HARQ-ACK bit is generated relative to the CC2 706.

The HARQ-ACK signaling so generated is then placed within a HARQ-ACK codebook 716 in ascending order of serving cell/component carrier index (and note that there is only one $k_3$ value). This HARQ-ACK codebook 716 is then sent to the base station on the PUCCH 718. Accordingly, the base station is made aware that the first M-DCI 710 and the second M-DCI 714 were received at the UE and that the UE is prepared to use any multi-PUSCH or multi-PDSCH scheduled using those M-DCI. In the case where the base station also attempted to schedule a multi-PUSCH or multi-PDSCH using an M-DCI corresponding to the failure 712, the base station is also made aware that such an M-DCI was not received, and that the UE is not prepared to use the corresponding multi-PUSCH or multi-PDSCH. The base station, in this case, can then use these resources for other purposes rather than allowing them to go to waste. Note that it may be in some cases that no M-DCI was ever actually sent in the MO corresponding to the failure 712, but under semi-static HARQ-ACK signaling methods the UE may not be aware of this (the base station accounts for this on its end).

Figure 8:
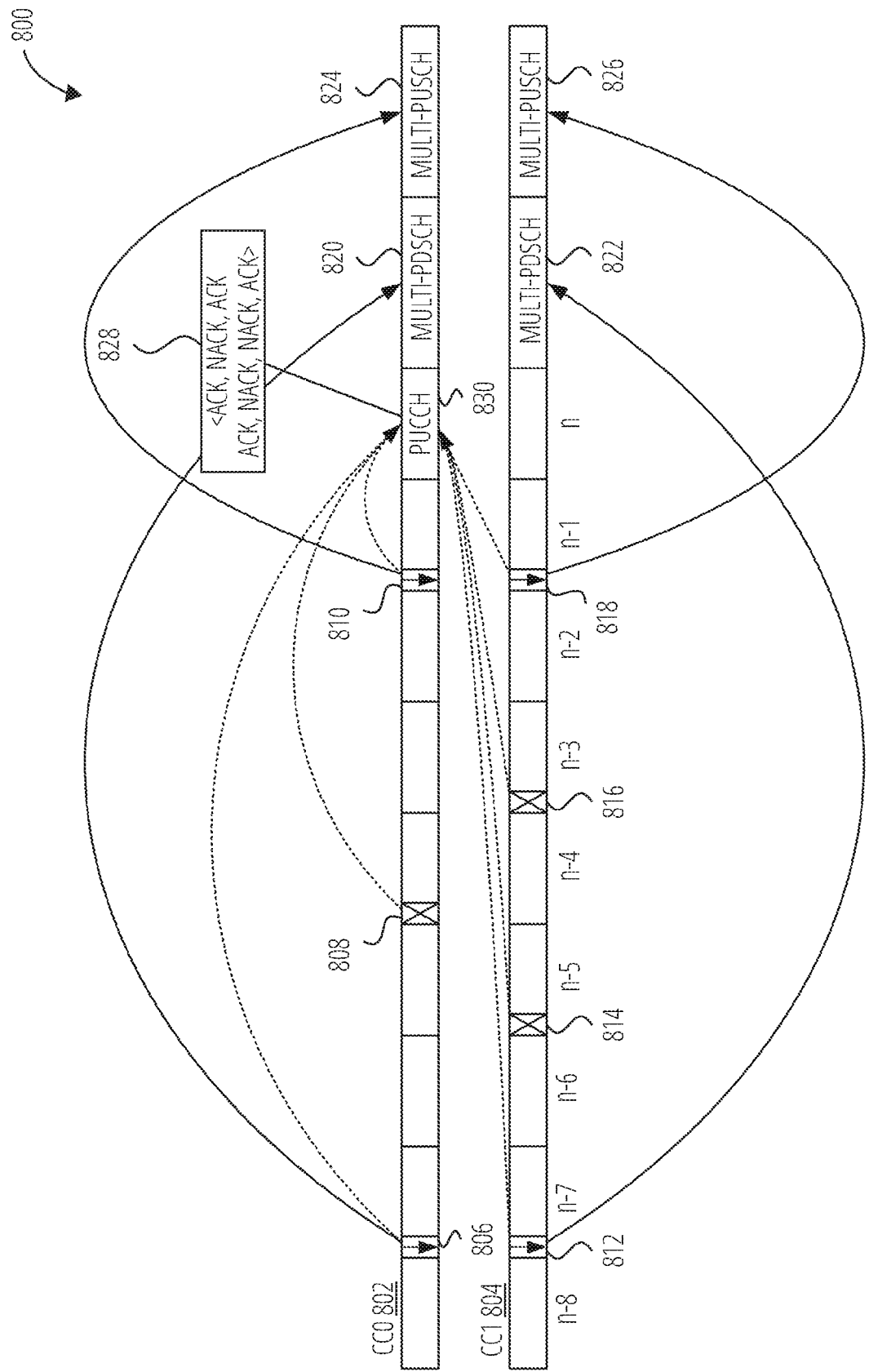
FIG. 8 illustrates signaling according to a use of a semi-static HARQ-ACK codebook to acknowledge receipt of M-DCI, according to an embodiment.

FIG. 8 illustrates signaling 800 according to a use of a semi-static HARQ-ACK codebook to acknowledge receipt of M-DCI, according to an embodiment. FIG. 8 illustrates that a UE uses two CCs, including the CC0 802 and the CC1 804. Further, the example of FIG. 8 presumes the UE has been configured with $k_3$=1, 2, 3, 4, 5, 6, 7, 8. The UE then uses this $k_3$ information to determine the locations of various MO across the CC0 802 and the CC1 804 according search space configuration(s) for the UE. As shown, the search space configuration for the CC0 802 may indicate a periodicity of three slots, while the search space configuration for the CC1 804 may indicate a periodicity of two slots. MO are determined accordingly (with MO occurring on CC0 802 during slots corresponding to each of the first M-DCI 806, the first failure 808, and the second M-DCI 810, and with MO occurring on CC1 804 during slots corresponding to each of the third M-DCI 812, the second failure 814, the third failure 816, and the fourth M-DCI 818). It may be that for some larger SCS (e.g., 960 kHz), a larger scheduling latency (e.g., up to $k_3$=8) is feasible due to the corresponding short slot durations in this case.

As shown in FIG. 8, the first M-DCI 806 on the CC0 802 is used to schedule a first multi-PDSCH 820 on the CC0 802, the second M-DCI 810 on the CC0 802 is used to schedule a first multi-PUSCH 824 on the CC0 802, the third M-DCI 812 on the CC1 804 is used to schedule a second multi-PDSCH 822 on the CC1 804, and the fourth M-DCI 818 on the CC1 804 is used to schedule a second multi-PUSCH 826 on the CC1 804. The first multi-PDSCH 820 and/or the second multi-PDSCH 822 may be scheduled by the base station in response to arrival at the base station of downlink data for the UE. The first multi-PUSCH 824 and the second multi-PUSCH 826 may be scheduled by the base station in response to a buffer status report (BSR) from the UE indicating that the UE has uplink data to send to the base station.

In the signaling 800, the UE generates an ACK corresponding to a successful receipt of the first M-DCI 806 during a first MO on the CC0 802, a NACK corresponding to a first failure 808 during which the UE does not receive an M-DCI during a second MO on the CC0 802, and an ACK corresponding to a successful receipt of the second M-DCI 810 during a third MO on the CC0 802.

Further, the UE generates an ACK corresponding to the successful receipt of the third M-DCI 812 during a first MO on the CC1 804, a NACK corresponding to a second failure 814 during which the UE does not receive an M-DCI during a second MO on the CC1 804, a NACK corresponding to a third failure 816 during which the UE does not receive an M-DCI during a third MO on the CC1 804, and an ACK corresponding to the successful receipt of the fourth M-DCI 818 during a fourth MO on the CC1 804.

The ACK for the first M-DCI 806, the NACK corresponding to the first failure 808, the ACK for the second M-DCI 810, the ACK for the third M-DCI 812, the NACK corresponding to the second failure 814, the NACK corresponding to the third failure 816, and the fourth M-DCI 818 may accordingly be considered acknowledgement signaling.

Note that because there was no MO associated with the slots n−8, n−6, n−5, n−3, and n−2 of the CC0 802, no related HARQ-ACK bit is generated relative to these. Similarly, because there was no MO associated with the slots n−8, n−6, n−4, and n−2 of the CC1 804, no HARQ-ACK bit is generated relative to these.

The HARQ-ACK signaling so generated is then placed within a HARQ-ACK codebook 828, first organized in ascending order of serving cell/component carrier index and then in descending order of the slot timing value in $k_3$ for the corresponding serving cell. This HARQ-ACK codebook 828 is then sent to the base station on the PUCCH 830. Accordingly, the base station is made aware that the first M-DCI 806, the second M-DCI 810, the third M-DCI 812, and the fourth M-DCI 818 were received at the UE and that the UE is prepared to use the corresponding first multi-PDSCH 820, first multi-PUSCH 824, second multi-PDSCH 822, and second multi-PUSCH 826. In the case where the base station also attempted to schedule a multi-PUSCH or multi-PDSCH using an M-DCI corresponding to any of the first failure 808, the second failure 814, or the third failure 816, the base station is also made aware that such M-DCI were not received, and that the UE is not prepared to use the corresponding multi-PUSCH or multi-PDSCH. The base station, in this case, can then use these resources for other purposes rather than allowing them to go to waste. As before, it may be in some cases that no M-DCI was ever actually sent in these MO, but under semi-static HARQ-ACK signaling methods the UE may not be aware of this (the base station accounts for this on its end).

In some embodiments, a dynamic HARQ-ACK codebook may be used to acknowledge the receipt of one or more M-DCI to the base station. In these cases, the dynamic HARQ-ACK codebook may be generated according to certain M-DCI formats transmitted by the gNB. Note that in some embodiments, as discussed above, these M-DCI may be transmitted on multiple CCs, in the case that the UE is so configured. Further, the UE may be configured with search space configuration(s) defining the location of one or more MO across the one or more CC.

Accordingly, to avoid potential ambiguity regarding the number of M-DCI associated with a same PUCCH slot n, certain information fields may be used in M-DCI formats used for dynamic HARQ-ACK signaling. A first of these information fields may include a counter multiple downlink assignment indicator (C-MDAI). A C-MDAI may denote an accumulative number of MO for which M-DCI are sent by the base station on one or more CC of one or more serving cells prior to the time of a slot during which the current M-DCI is received and through the one or more CC (in serving cell/component carrier index order) on the current slot until the current MO for the current M-DCI. Accordingly, this indicator first accumulates according to each MO for which M-DCI was sent by the base station of a first slot across the CCs (and in the serving cell/component carrier index order), and then proceeds by accumulating similarly through any remaining subsequent slots of the CCs in order (as will be illustrated).

In cases where the UE is provided with a core resource set (CORESET) PoolIndex with a value 0 for a first CORESET and a value 1 for a second CORESET any uses joint HARQ-ACK feedback, the value of a C-MDAI may be given in the order of the first CORESET and then the second CORESET.

A second of these information fields may include a total multiple downlink assignment indicator (T-MDAI). A T-MDAI may denote a total number of MO for which M-DCI was sent by the base station on one or more CC of one or more serving cells by a time of a slot during which the current M-DCI is received (and regardless of serving cell/component carrier index order) (as will be illustrated). As the T-MDAI does not change across slots, a UE may assume that all M-DCI received in the same slot use the same T-MDAI value.

The dynamic HARQ-ACK method may differ from the semi-static HARQ-ACK methods previously described, in that when using the dynamic HARQ-ACK method, only MO for which the base station actually sent M-DCI are reported to the base station (as enabled by the use of the T-MDAI and the C-MDAI, as will be shown). This may reduce signaling as compared to semi-static HARQ-ACK methods, where all configured MO (including those for which the base station did not send M-DCI) may be reported in a HARQ-ACK codebook.

Figure 9:
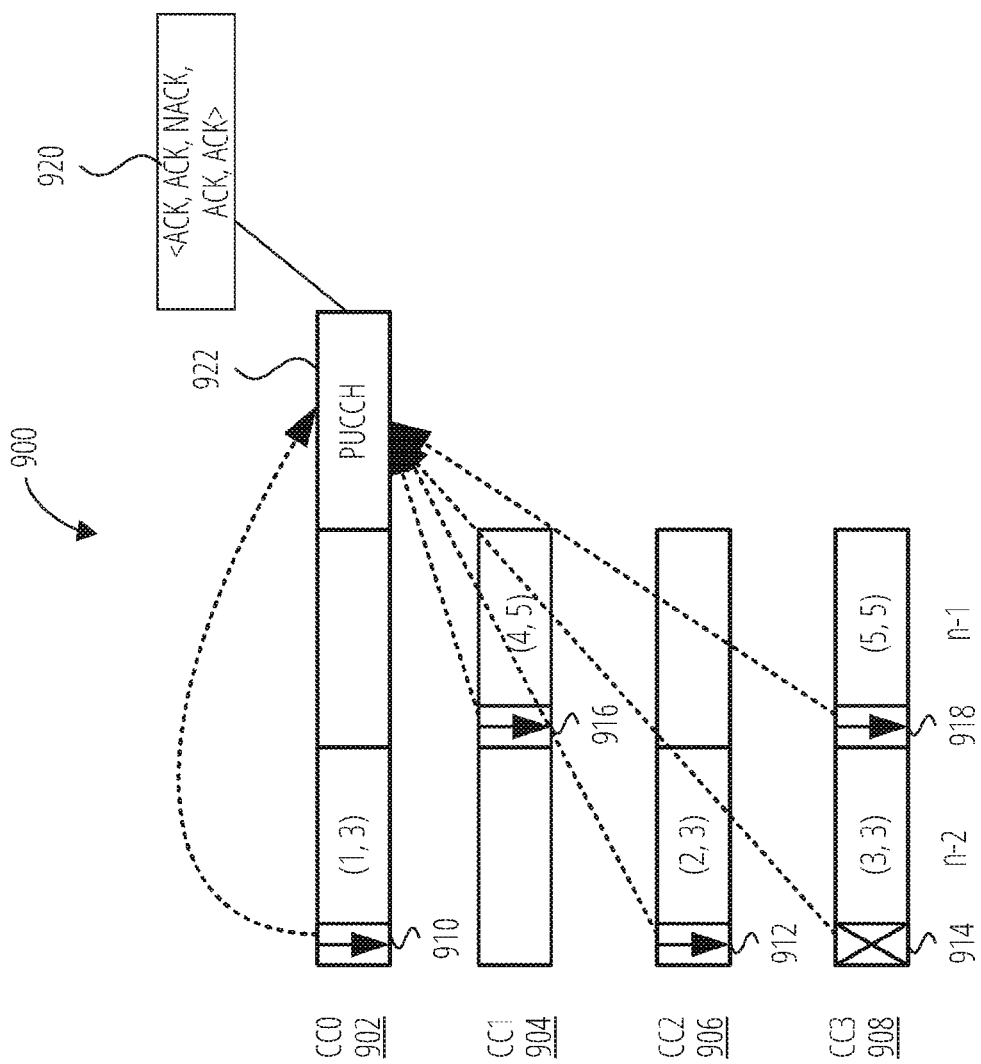
FIG. 9 illustrates signaling according to a use of a dynamic HARQ-ACK codebook method to acknowledge receipt of M-DCI, according to an embodiment.

FIG. 9 illustrates signaling 900 according to a use of a dynamic HARQ-ACK codebook method to acknowledge receipt of M-DCI, according to an embodiment. FIG. 9 illustrates that a UE uses four CCs, including the CC0 902, the CC1 904, the CC2 906, and the CC3 908. Further, the example of FIG. 9 presumes the use of $k_3=1$, 2 and determines the locations of various MO across the CC0 902, CC1 904, CC2 906, and CC3 908 according search space configuration(s) for the UE, in the manner described above.

In the example of FIG. 9, the UE receives/is configured to receive M-DCI according to a dynamic HARQ-ACK codebook functionality, with such M-DCI having C-MDAI and T-MDAI values. In the example of FIG. 9, these are illustrated in "(<C-MDAI value>, <T-MDAI value>)" format.

The UE receives a first M-DCI 910 during a first MO on the CC0 902 having a (1, 3) indication (illustrated). The C-MDAI value of 1 indicates that there has been an accumulation of one MO for which M-DCI was sent by the base station by the time of the slot n−2 and through the CC0 902.

The T-MDAI value of 3 indicates that there are a total number of 3 MO for which M-DCI was sent by the base station across the CC0 902, the CC1 904, the CC2 906, and the CC3 908 by a time of the slot n−2. Accordingly, the UE generates an ACK corresponding to a successful receipt of the first M-DCI 910.

The UE receives a second M-DCI 912 during a second MO on the CC2 906 having a (2, 3) indication (illustrated). The C-MDAI value of 2 indicates that there has been an accumulation of two MO for which M-DCI was sent by the base station by the time of the slot n−2 and through the CC2 906. The T-MDAI value of 3 indicates that there are a total number of 3 MO for which M-DCI was sent by the base station across the CC0 902, the CC1 904, the CC2 906, and the CC3 908 by a time of the slot n−2. Accordingly, the UE generates an ACK corresponding to a successful receipt of the second M-DCI 912.

A third MO corresponds to a failure 914 to receive an M-DCI during that MO. In the example of FIG. 9, the base station sent an M-DCI corresponding to that MO, but it was not successfully received at the UE. That M-DCI had a (3, 3) indication (illustrated). The C-MDAI value of 3 indicated that there had been an accumulation of three MO for which M-DCI was sent by the base station by the time of the slot n−2 and through the CC3 908. The T-MDAI value of 3 indicated that were are a total number of 3 MO for which M-DCI was sent by the base station across the CC0 902, the CC1 904, the CC2 906, and the CC3 908 by a time of the slot n−2.

At this juncture, the use of C-MDAI and/or T-MDAI to identify any missed M-DCI that were actually transmitted by the base station may occur. Note that determinations of whether an MO that lacked M-DCI corresponded to an actually transmitted M-DCI as made by the UE using C-MDAI and/or T-MDAI may be made either when the timing proceeds to a subsequent slot without the UE having received the appropriate number of M-DCI in that slot on all the component carriers, and/or may be made when the UE receives C-MDAI and/or T-MDAI values ahead of the expected ones (which indicates that one or more M-DCI have not been received).

For example, when making missed M-DCI determinations relative to checking for an appropriate number of M-DCI in the slot n−2, because the first M-DCI 910 and the second M-DCI 912 each contained an T-MDAI value of 3, the UE is aware that it should have received another M-DCI during the slot n−2. Further, because the CC1 904 contains a C-MDAI value of 1 and the CC2 906 contains a C-MDAI value of 2, the UE is aware of the relative position of missing M-DCI. Accordingly, the UE concludes that the MO for the failure 914 corresponded to an M-DCI that was actually sent by the base station, and generates an NACK corresponding to the failure 914 to receive the missing M-DCI in the n−2 slot.

In the case of making missed M-DCI determinations relative to receiving C-MDAI and/or T-MDAI values ahead of expected ones, the UE receives a third M-DCI 916 during a second MO of the CC2 906 having a (4, 5) indication (illustrated). Then, because the second M-DCI 912 used a C-MDAI value of 2 and the third M-DCI 916 used a C-MDAI value of 4 (and not 3), the UE is aware that the failure 712 occurred between the second M-DCI 912 and the third M-DCI 916 (relative to the ultimate reporting order). Further, because the first M-DCI 910 (or, alternatively, because the second M-DCI 912) used a T-MDAI value of 3, the UE is aware that there should have been total of three M-DCI received during slot n−2, and thus the failure 914 must have occurred during slot n−2. With this information, the UE concludes that the MO for the failure 914 corresponded to an M-DCI that was actually sent by the base station, and generates a NACK corresponding to the failure 914 to receive the missing M-DCI in the n−2 slot.

Returning to the third M-DCI 916, the C-MDAI value of 4 indicates that there has been an accumulation of four MO for which M-DCI was sent by the base station by the time of the slot n−1 and through the CC1 904. The T-MDAI value of 5 indicates that there are a total number of 5 MO for which M-DCI was sent by the base station across the CC0 902, the CC1 904, the CC2 906, and the CC3 908 by a time of the slot n−1. Accordingly, the UE generates an ACK corresponding to a successful receipt of the third M-DCI 916.

The UE receives a fourth M-DCI 918 during a fifth MO on the CC2 906 having a (5, 5) indication (illustrated). The C-MDAI value of 5 indicates that there has been an accumulation of five MO for which M-DCI was sent by the base station by the time of the slot n−1 and through the CC3 908. The T-MDAI value of 5 indicates that there are a total number of 5 MO for which M-DCI was sent by the base station across the CC0 902, the CC1 904, the CC2 906, and the CC3 908 by a time of the slot n−1. Accordingly, the UE generates an ACK corresponding to a successful receipt of the second M-DCI 912.

The HARQ-ACK signaling so generated is then placed within a HARQ-ACK codebook 920, first in descending order of the slot timing value in $k_3$ and then in ascending order according to serving cell/component carrier index. In other words, the codebook is organized into subsets according to descending order of the applicable $k_3$, and then the bits of each such subset are ordered according to serving cell/component carrier index for the respective bits. This HARQ-ACK codebook 920 is then sent to the base station on the PUCCH 922. Accordingly, the base station is made aware that the first M-DCI 910, the second M-DCI 912, the third M-DCI 916, and the fourth M-DCI 918 were received at the UE and that the UE is prepared to use the corresponding multi-PUSCH/multi-PDSCH. Further, the base station is also made aware that the M-DCI corresponding to the failure 914 was not received, and that the UE is not prepared to use any corresponding multi-PUSCH/multi-PDSCH. The base station, in this case, can then use these resources for other purposes rather than allowing them to go to waste.

FIG. 10 illustrates the contents of a DCI IE 1000 of DCI (e.g., M-DCI) sent according to the use of a dynamic HARQ-ACK codebook, according to an embodiment. Among other things, such a DCI IE 1000 may include a C-MDAI field 1002 and a T-MDAI field 1004 (and note that in some cases, each of the C-MDAI field 1002 and T-MDAI field 1004 may instead be considered individual IE of the DCI). Each of these may contain a number of bits in the M-DCI format that is used to indicate a corresponding C-MDAI value or T-MDAI value, as appropriate.

A number of bits in one embodiment of an M-DCI format that is used to indicate a C-MDAI value may be denoted $N_C$, and a value T1 for the number of values that can be represented by the $N_C$ bits is accordingly $2^{N_C}$. In that same embodiment, a number of bits in the M-DCI format used to indicate a T-MDAI value may be denoted $N_T$, and a value T2 for the number of values that can be represented by $N_T$ is accordingly $2^{N_T}$. Then, for example, in the case of a DCI IE 1000 having a 2-bit C-MDAI field 1002 ($N_C$=2) and a 2-bit T-MDAI field 1004 ($N_T$=2), T1=T2=$2^2$=4.

TABLE 1

Values of C-MDAI and T-MDAI for 2-bits IE

| C-MDAI or T-MDAI IE in DCI MSB, LSB | Values of C-MDAI or T-MDAI IE | Number of {serving cell, MO)-pair(s)} for which M-DCI is counted according to {C-MDAI, T-MDAI}, denote as {X, Y} and X >= 1, Y >= 1 |
|---|---|---|
| 0, 0 | 1 | (X − 1) mod T1 = 0; (Y − 1) mod T2 = 0 |
| 0, 1 | 2 | (X − 1) mod T1 = 1; (Y − 1) mod T2 = 1 |
| 1, 0 | 3 | (X − 1) mod T1 = 2; (Y − 1) mod T2 = 2 |
| 1, 1 | 4 | (X − 1) mod T1 = 3; (Y − 1) mod T2 = 3 |

As shown in Table 1, due to the limitation imposed on $N_C$ and $N_T$ as to bit width, a modulo is used when the value of $2^{N_C}$ and $2^{N_T}$, respectively, is exceeded. This limitation on these bit widths may improve resource efficiency of the M-DCI using C-MDAI and T-MDAI. In the provided embodiment of $N_C$=$N_T$=2, due to the modulo operation, a corresponding set of values X (for C-MDAI) and, separately, Y for (T-MDAI), share a same 2-bit state. For example, state '00' is used for values 1/5/9, state '01' is used for values 2/6/10, etc.

FIG. 11 illustrates signaling 1100 using modulo operation for C-MDAI field and T-MDAI field use in an M-DCI, according to an embodiment. FIG. 11 illustrates the bit-wise C-MDAI and T-MDAI contents 1104 of various DCI received (or failed to be received) during MO on the CC0 1106, the CC1 1108, the CC2 1110, and the CC3 1112 in the case of $N_C$=$N_T$=2.

Referring to the FIG. 11, each of the C-MDAI and T-MDAI values of an M-DCI 1102 received on its corresponding MO on CC2 1110 are (5,5), corresponding to the methodology for such values described above. However, as T1=T2=4 in this embodiment (in accordance with 2-bit field size for each of $N_C$ and $N_T$), the C-MDAI and T-MDAI elements of the IE in the M-DCI 1102 would be set as <00, 00> based on the use of Table 1 (and note that the T-MDAI bits of 00 are used to indicate the same T-MDAI value for the M-DCI 1114 that is in the same slot as the M-DCI 1102, for the same reasons.

At the UE side, UE would interpret the value as (5, 5) (instead of (1,1)), as, for example (3,3) (corresponding to <10,10>) has already been detected on the CC3 1112 during the previous slot, and the UE understands that each of the C-MDAI and T-MDAI values are supposed to increase over time.

Note that cases other than $N_C$=$N_T$=2 are contemplated, with appropriate variations to the operation described here for the different value(s) other than 2. Further, it is contemplated that in some cases $N_C$ and $N_T$ may be different values.

In some embodiments, a HARQ-ACK request (HR) field may be used in a DCI. This DCI may use the HR field to indicate to a receiving UE that the UE should provide a HARQ-ACK codebook corresponding to one or more MO for M-DCI occurring during a monitoring window (MW). The HR field may be a single bit wide, and it may make the indication to use the MW as described when a "1" is placed in the HR field. In this disclosure, DCI that uses an HR field to make an indication to use a MW may be called "triggering DCI."

In some embodiments, triggering DCI can be UE-specific DCI used to trigger a HARQ-ACK codebook for one or more M-DCI of the MW at the UE. It is contemplated that triggering DCI may itself be M-DCI, S-DCI, or some other format that can be UE-specific, with or without PUSCH/PDSCH scheduling of any kind.

In some embodiments, a frequency domain resource allocation (FDRA) field in a triggering DCI may indicate that the triggering DCI does not schedule data. For example, for resource allocation (RA) Type0, an FDRA with all bits set to 0 may be used to indicate that the triggering DCI does not schedule data. For RA Type1, an FDRA with all bits set to 1 may be used to indicate that the triggering DCI does not schedule data.

Upon receipt of triggering DCI, the UE is to provide HARQ-ACK information (e.g., a HARQ-ACK codebook) for a set of M-DCI within a MW. This HARQ-ACK information may be received after N symbols from a last symbol of a PDCCH providing an M-DCI reported on in the HARQ-ACK information (similarly to the description of FIG. 3 above).

The determination of the location and size of the relevant MW will now be described. In some embodiments, the end of the MW is placed S symbols before the first symbol of the PUCCH resource that is triggered by the triggering DCI. The size of the MW itself is then determined in one of various possible ways. In some cases, the size of the MW may be configured by RRC signaling, or it may be according to a predetermination made according to a specification with which the wireless communication system is compliant. In other cases, a set of possible values for the MW size may be configured by RRC signaling. Then, a medium access control (MAC) control element (MAC CE) may indicate which of these should be used. This method may be more efficient than methods that use explicit RRC signaling. In other cases, a set of values may be configured by RRC signaling for MW size. One of these configured values may then be dynamically indicated by a dedicated field found in a triggering DCI. This method may be more efficient than MAC CE methods described.

Note that in the case of CA, the MW size may be set on a per CC basis. Further, various CC may be split into different groups, and CC in one group may be triggered for HARQ-ACK reporting (this may help control the HARQ-ACK payload size).

The UE may provide the HARQ-ACK signaling (e.g., the HARQ-ACK codebook) in a slot that is $k_4$ slots from a slot of the triggering DCI (and this $k_4$ value may be indicated in the triggering DCI).

Figure 12:
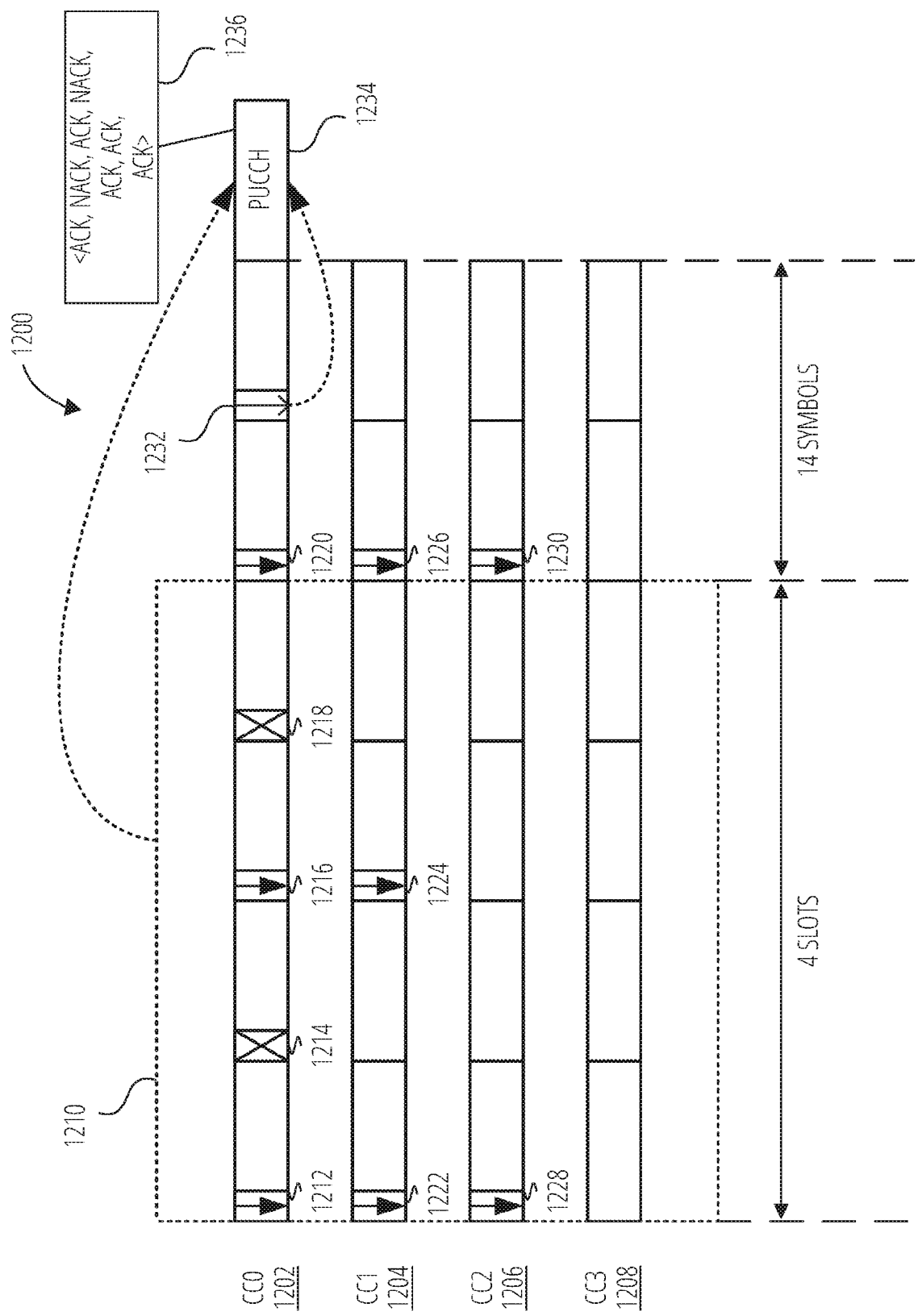
FIG. 12 illustrates signaling according to the use of a HARQ-ACK codebook method for acknowledging the receipt of M-DCI in a monitoring window responsive to triggering DCI, according to an embodiment.

FIG. 12 illustrates signaling 1200 according to the use of a HARQ-ACK codebook method for acknowledging the receipt of M-DCI in a MW responsive to triggering DCI, according to an embodiment. FIG. 12 illustrates that a UE uses four CCs, including the CC0 1202, the CC1 1204, the CC2 1206, and the CC3 1208. In the embodiment of FIG. 12, it is presumed that the UE is configured to use a MW size of 4 slots for each of these CC (though this value could in other embodiments be different for each CC as described above, in which case the MW on that CC would be extended/shortened accordingly). Further, the configured periodicity of MO on the CC0 1202 is 1 slot, the configured periodicity of MO on the CC1 1204 is 2 slots with a zero offset, the configured periodicity of MO on the CC2 1206 is 4 with a zero offset, and that M-DCI is not configured for use on the CC3 1208. It is also presumed in this case that the UE is configured for N=10 and S=14 (in the case that μ=0).

As illustrated, according to the configured MO for the CC0 1202, the UE receives the first M-DCI 1212, experiences the first failure 1214, receives the second M-DCI 1216, experiences the second failure 1218, receives the third M-DCI 1220. Further, according to the configured MO for the CC1 1204, the UE receives the fourth M-DCI 1222, the fifth M-DCI 1224, and the sixth M-DCI 1226. Finally, according to the configured MO for the CC2 1206, the UE receives the seventh M-DCI 1228 and the eighth M-DCI 1230.

After this occurs, the UE receives a triggering DCI 1232. The triggering DCI 1232 may include, for example, an HR field that is set to 1, which triggers the use of a MW 1210. In this instance, the end of the MW 1210 has been set back 14 symbols from the beginning of the PUCCH 1234, according to the value of S previously noted. Further the MW 1210 has a duration of 4 slots, as previously supposed.

Correspondingly, the UE develops the HARQ_ACK codebook 1236 comprising an ACK for the first M-DCI 1212, a NACK for the first failure 1214, an ACK for the second M-DCI 1216, a NACK for the second failure 1218, an ACK for the fourth M-DCI 1222, an ACK for the fifth M-DCI 1224, and an ACK for the seventh M-DCI 1228. As illustrated, the third M-DCI 1220, the sixth M-DCI 1226, and the eighth M-DCI 1230 are not included in the HARQ_ACK codebook 1236. This is because they fall outside the MW 1210 (because the distance between last symbol for each of their MO and the first symbol of the PUCCH 1234 is smaller than S symbols).

Figure 13:
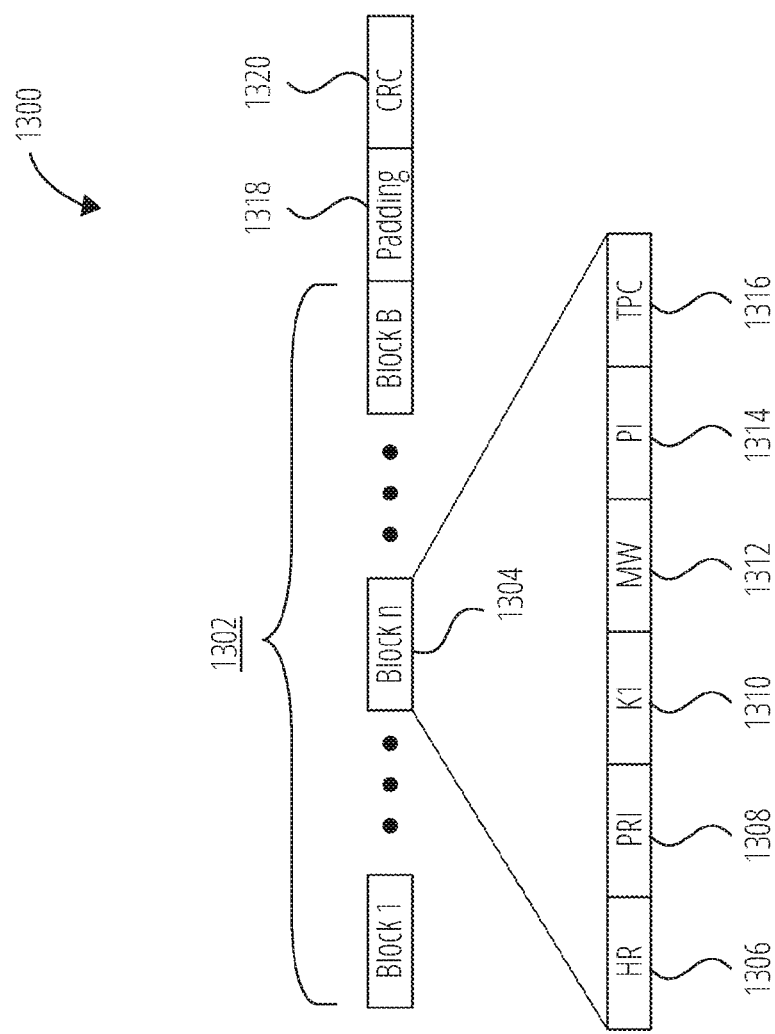
FIG. 13 illustrates a triggering DCI according to an embodiment.

FIG. 13 illustrates a triggering DCI 1300 according to an embodiment. As opposed to triggering DCI as UE-specific DCI previously described, the triggering DCI 1300 may be of a group-common DCI format that can be used to trigger HARQ-ACK feedback for a group of UE.

In some embodiments, the triggering DCI 1300 uses cyclic redundancy check (CRC) scrambling based on an HR radio network temporary identifier (HR-RNTI). The HR-RNTI may be configured to the UE in the group by RRC signaling, or it may be predetermined according to a specification with which the wireless communication system is compliant. At the base station, the HR-RNTI may be used to scramble the CRC field 1320 of the triggering DCI 1300. The UE then uses the HR-RNTI against the triggering DCI 1300 (e.g., against/by scrambling the CRC field 1320) to determine whether a same CRC is generated as was received. In this way, a UE of the group thereby identifying that the triggering DCI 1300 is intended for the UE.

The triggering DCI 1300 may comprise a number of blocks 1302 (illustrated in FIG. 13 as ranging from block 1, through block n 1304, and to block B). Each of the blocks 1302 may correspond to one UE of the group of UE. A UE may be aware of the starting position of its corresponding block within the triggering DCI 1300. This starting position may be provided to the UE via dedicated RRC signaling. In other embodiments, assuming that each of the blocks 1302 is of an identical size, the UE may instead be configured with a block index that is used by the UE to locate its corresponding block.

Each of the blocks 1302 (including the block n 1304) may comprise one or more fields. An HR field 1306 may contain an HR as described above, and may be 1 bit. A PRI field 1308 may include a relevant PRI for the UE and may be 3 bits. A K1 field 1310 (or PDSCH-to-HARQ_feedback timing indicator field) may include a relevant PDSCH-to-HARQ_feedback timing for the UE, and may be 0, 1, 2, or 3 bits. Note that in some alternative embodiments, a single K1 field may instead be provided within the triggering DCI 1300 that applies to all the UE using the triggering DCI 1300. A MW field 1312 may communicate the size of a MW for the UE to use (as described above), and be 0, 1, or 2 bits. The bit width for this field may be determined as $\log_2(M)$, where I is the number of entries/possibilities for MW size as provided by higher layers. A priority indicator (PI) field 1314 may be a single bit set to 0 or 1, depending on whether the UE is configured with different priorities or not. For example, a UE may be configured with two priorities. The field size of the PI field may thus be 1 bit, as described. Setting this PI field to '1' may correspond to HARQ-ACK feedback with a high priority, and setting this PI field to '0' may correspond to HARQ-ACK feedback with low priority. Finally, a transmitter power control (TPC) command field 1316 may be 2 bits, and may be used to configure a transmission power at the corresponding UE.

The triggering DCI 1300 may further include padding bits 1318, which may be used to align the triggering DCI 1300 with another DCI format known to the wireless communication system (so that an increase in the number of blind decodings for PDCCH is avoided).

In some embodiments, a UE may be configured to use either semi-static HARQ-ACK codebook methods or dynamic HARQ-ACK codebook methods by dedicated RRC signaling on a per-UE basis as part of multi-PUSCH or multi-PDSCH configuration. Further, the UE may be configured to enable the use of MW reporting and/or the use of triggering DCI using a group-common DCI format, in the manner described above.

In some embodiments, may occur that other HARQ-ACK signaling (e.g., HARQ-ACK signaling not necessarily related to acknowledgement signaling for one or more M-DCI) may conflict with the HARQ-ACK signaling for the acknowledgement of the one or more M-DCI (e.g., may conflict with the HARQ-ACK codebooks described above). For example, it may be that HARQ-ACK signaling for previous, unrelated downlink signaling from the base station may conflict with HARQ-ACK signaling for the acknowledgement of the one or more M-DCI.

One of multiple approaches for resolving these conflicts may be used. Under a first approach, the UE may concatenate this other HARQ-ACK signaling with the HARQ-ACK signaling for the acknowledgement of the one or more M-DCI in order to obtain a total number of HARQ-ACK information bits to transmit on PUCCH or PUSCH.

Figure 14:
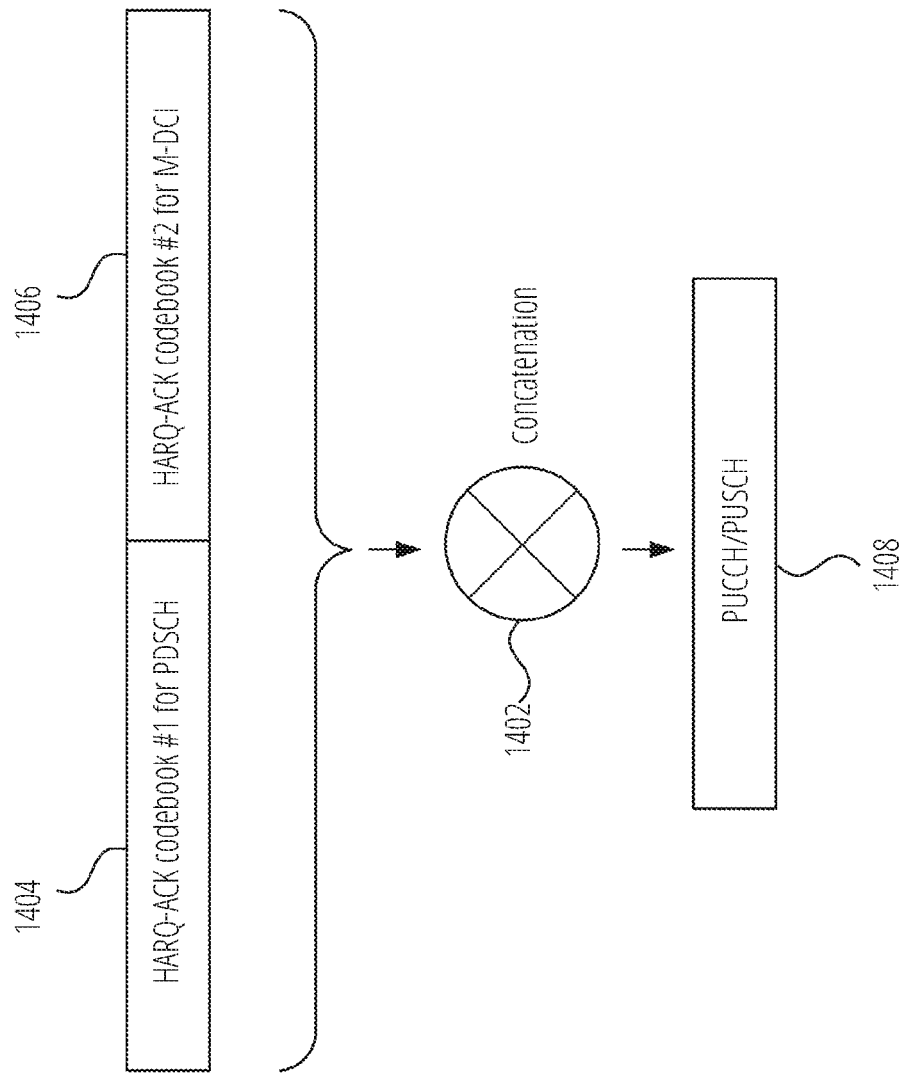
FIG. 14 illustrates the concatenation of a first HARQ-ACK codebook with a second HARQ-ACK codebook used to acknowledge the receipt of M-DCI, according to an embodiment.

FIG. 14 illustrates the concatenation 1402 of a first HARQ-ACK codebook 1404 with second HARQ-ACK codebook 1406 used to acknowledge the receipt of M-DCI, according to an embodiment. As illustrated, the first HARQ-ACK codebook 1404 may, for example, comprise HARQ-ACK signaling for previous downlink signaling from the base station that is unrelated to the acknowledgement of M-DCI (such as previous PDSCH signaling). The concatenation 1402 may occur relative to the first HARQ-ACK codebook 1404 and the second HARQ-ACK codebook 1406 in either order (e.g., the concatenated result may have the first HARQ-ACK codebook 1404 first or the second HARQ-ACK codebook 1406 first). The ordering may be predefined (e.g., according to signaling from the base station or according to a specification with which the wireless communication system is compliant). The concatenated result may then be sent on a PUCCH or PUSCH 1408.

Under a second approach, a higher layer parameter may be provided to the UE that indicates the use of the concatenation method illustrated in FIG. 8. If this indication is not made, the UE may, for example, drop the other HARQ-ACK signaling (corresponding to the first HARQ-ACK codebook 1404) and transmit (only) the HARQ-ACK signaling for the acknowledgement of the one or more M-DCI (corresponding to the second HARQ-ACK codebook 1406).

In some embodiments, one or more aperiodic sounding reference signals (A-SRS) may be used to acknowledge the receipt of one or more M-DCI to the base station. Note that in some embodiments, as discussed above, these M-DCI may be spread through multiple CCs, in the case that the UE is so configured. As before, the UE may be configured with search space configuration(s) defining the location of one or more MO across the one or more CC.

In these embodiments, when a UE is configured to use M-DCI, the UE is also configured with A-SRS resources. Receipt at the base station of an A-SRS resource corresponding to an M-DCI accordingly acts as acknowledgement signaling for the M-DCI to the base station.

For each A-SRS resource, a slot-level offset is configured by higher layers between a last symbol of a PDCCH with an M-DCI (which triggers the A-SRS transmission) and the first symbol of the triggered A-SRS resource.

In some embodiments, a UE may be configured with $K \geq 1$ A-SRS resources by RRC signaling, where the maximum value of K is indicated by or according to a UE capability. A UE may be configured with a subset of A-SRS resources by the higher layer parameter 'usage' as 'MdciAcknowledgement.'

In some embodiments, a sounding reference signal (SRS) request field in a received M-DCI is used to select at least one of the configured A-SRS resources that is set to 'MdciAcknowledgement.' In some embodiments, the A-SRS selected is on the same serving cell where the M-DCI is detected by the UE. In other embodiments, the A-SRS selected is on a different serving cell from where the M-DCI is detected by the UE. In these cases, there an association between a CC where the SRS is selected for use and the value of the SRS field received in the M-DCI may be configured by RRC signaling.

Further, in other embodiments, a single A-SRS resource is configured for use, and is transmitted once the M-DCI is detected. In these cases, no SRS request field may be used.

In cases where CA is used, multiple A-SRS resources on different serving cells that are so triggered by different M-DCI may be fully or partially symbol-wise overlapped.

In the case where a PUCCH having HARQ-ACK signaling and the A-SRS resource are on the same carrier and overlap, a UE may drop the A-SRS signaling for M-DCI acknowledgement and prioritize instead the HARQ-ACK signaling. However, this may depend on the contents of the HARQ-ACK signaling (e.g., the HARQ-ACK signaling may take priority in the case where it carries one or more channel state information (CSI reports), one or more layer 1 (L1) reference signal received power (RSRP) (L1-RSRP) reports, and/or one or more L1 signal-to-noise and interference (SINR) (L1-SINR) reports).

Figure 15:
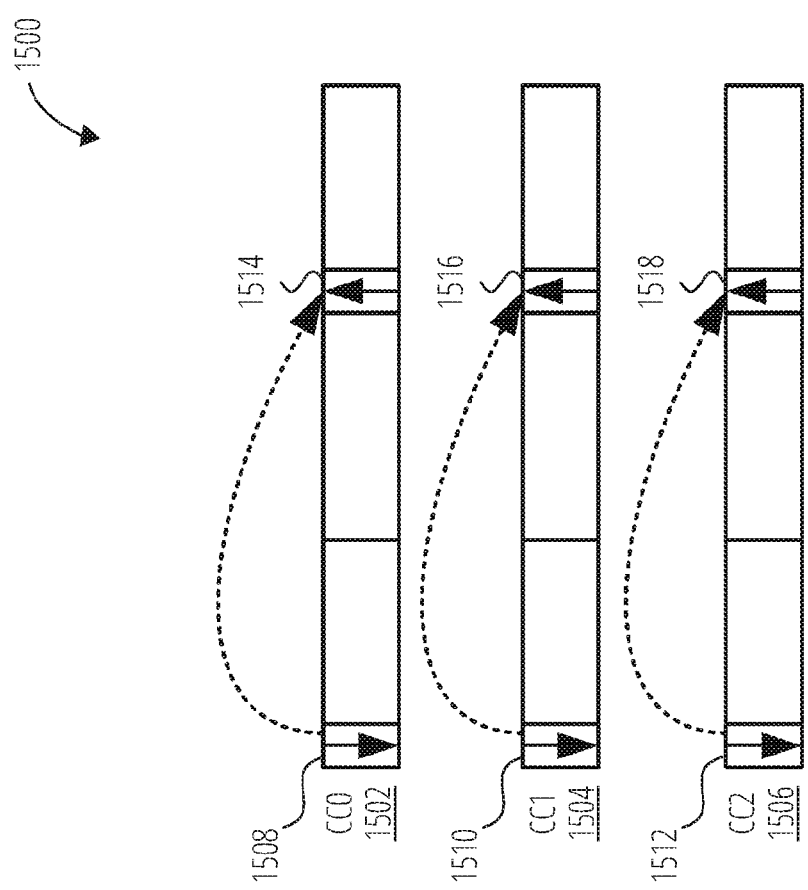
FIG. 15 illustrates signaling according to a use of A-SRS resources to acknowledge receipt of M-DCI, according to an embodiment.

FIG. 15 illustrates signaling 1500 according to a use of A-SRS resources to acknowledge receipt of M-DCI, according to an embodiment. As illustrated, the UE uses three serving cells, respectively providing CC0 1502, the CC1 1504, and the CC2 1506.

FIG. 15 illustrates a case were triggered A-SRS resources are sent on the same CC which was used to receive the M-DCI triggering the use of the A-SRS resource. Accordingly, as illustrated, the first M-DCI 1508 is received on the CC0 1502 and triggers the sending of the first A-SRS resource 1514 on the CC0 1502. The second M-DCI 1510 is received on the CC1 1504 and triggers the sending of the second A-SRS resource 1516 on the CC1 1504. Finally, the third M-DCI 1512 is received on the CC2 1506 and triggers the sending of the third A-SRS resource 1518 on the CC2 1506.

Figure 16:
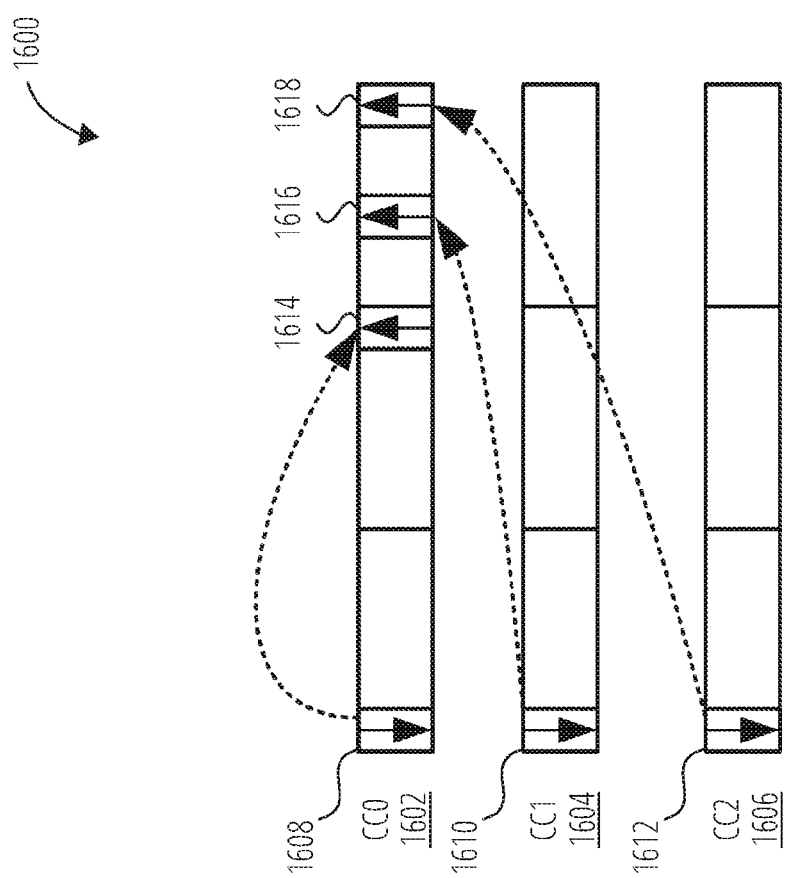
FIG. 16 illustrates signaling according to a use of A-SRS resources to acknowledge receipt of M-DCI, according to an embodiment.

FIG. 16 illustrates signaling 1600 according to a use of A-SRS resources to acknowledge receipt of M-DCI, according to an embodiment. As illustrated, the UE uses three serving cells, respectively providing CC0 1602, the CC1 1604, and the CC2 1606.

FIG. 16 illustrates a case were a triggered A-SRS resources is (in some cases) sent on a different CC than the CC used to receive the M-DCI triggering the use of the A-SRS resource. This may occur according to a configuration that instructs the UE to use a single CC for such A-SRS resources. Accordingly, as illustrated, the first M-DCI 1608 is received on the CC0 1602 and triggers the sending of the first A-SRS resource 1614 on the CC0 1602. The second M-DCI 1610 is received on the CC1 1604 and triggers the sending of the second A-SRS resource 1616 on the CC0 1502. Finally, the third M-DCI 1612 is received on the CC2 1606 and triggers the sending of the third A-SRS resource 1618 on the CC0 1502.

According to some embodiments, the acknowledgement signaling methods for M-DCI as described herein may be enabled or disabled. In a first case, it may be that dedicated RRC signaling is used on a per-UE basis to indicate whether such acknowledgement signaling should be used. This may be based on channel conditions at the UE and/or UE SINR geometry (each of which may be an example of a channel quality at the UE).

For example, for cell-center UEs with good SINR geometry, it may that M-DCI detection/receipt is relatively reliable. Accordingly, the need for an additional mechanism (e.g., acknowledgement signaling methods) to confirm M-DCI receipt is not as relatively worth the overhead required. In these cases, the gNB may disable the use of acknowledgement signaling methods for M-DCI at that UE, and instead simply send the M-DCI without the expectation of acknowledgement signaling in return from that UE. Further, any use of C-DCI may also be dropped.

To reduce signaling overhead, one of a first mode where acknowledgement signaling methods (and possibly C-DCI use, though this is not required) are enabled and a second mode where acknowledgement signaling methods (and possibly any C-DCI use) are disabled may be operated as a default mode (e.g., as pre-determined by a specification with which the wireless communication system is compliant), and the UE can be instructed to use the other mode in response to signaling from the base station indicating the same. For example, in some embodiments, acknowledgement signaling methods (and any C-DCI expectation) are assumed to be disabled by default unless the UE receives an explicit configuration to use acknowledgement signaling methods (and possibly to expect C-DCI).

In other embodiments, acknowledgement signaling methods (and possible C-DCI use, though this is not required) may be implicitly enabled/disabled based on the number of PUSCH/PDSCH are in the multi-PUSCH/multi-PDSCH scheduled by the received M-DCI. A threshold for the number of PUSCH/PDSCH that will trigger the enablement of the acknowledgement signaling methods (and possible C-DCI expectation) may be denoted as M. The value of M may be set on a per-UE basis. Once M is known to the UE, acknowledgement signaling methods (and possibly an expectation of C-DCI use) may be triggered at the UE in the case that a number of scheduled PUSCH/PDSCH in the multi-PUSCH/multi-PDSCH scheduled by the M-DCI (denoted m) is greater than (or in other embodiments, greater than or equal to) M.

The selection of the threshold M as described may be set higher or lower to account for the balancing considerations of 1) spectrum efficiency opportunity cost incurred due to the use of the acknowledgement signaling methods (and possible C-DCI use) and 2) the possible spectrum efficiency loss if an M-DCI scheduling a corresponding amount of PUSCH/PDSCH in a multi-PUSCH/multi-PDSCH is missed at the UE without the base station's knowledge.

Figure 17:
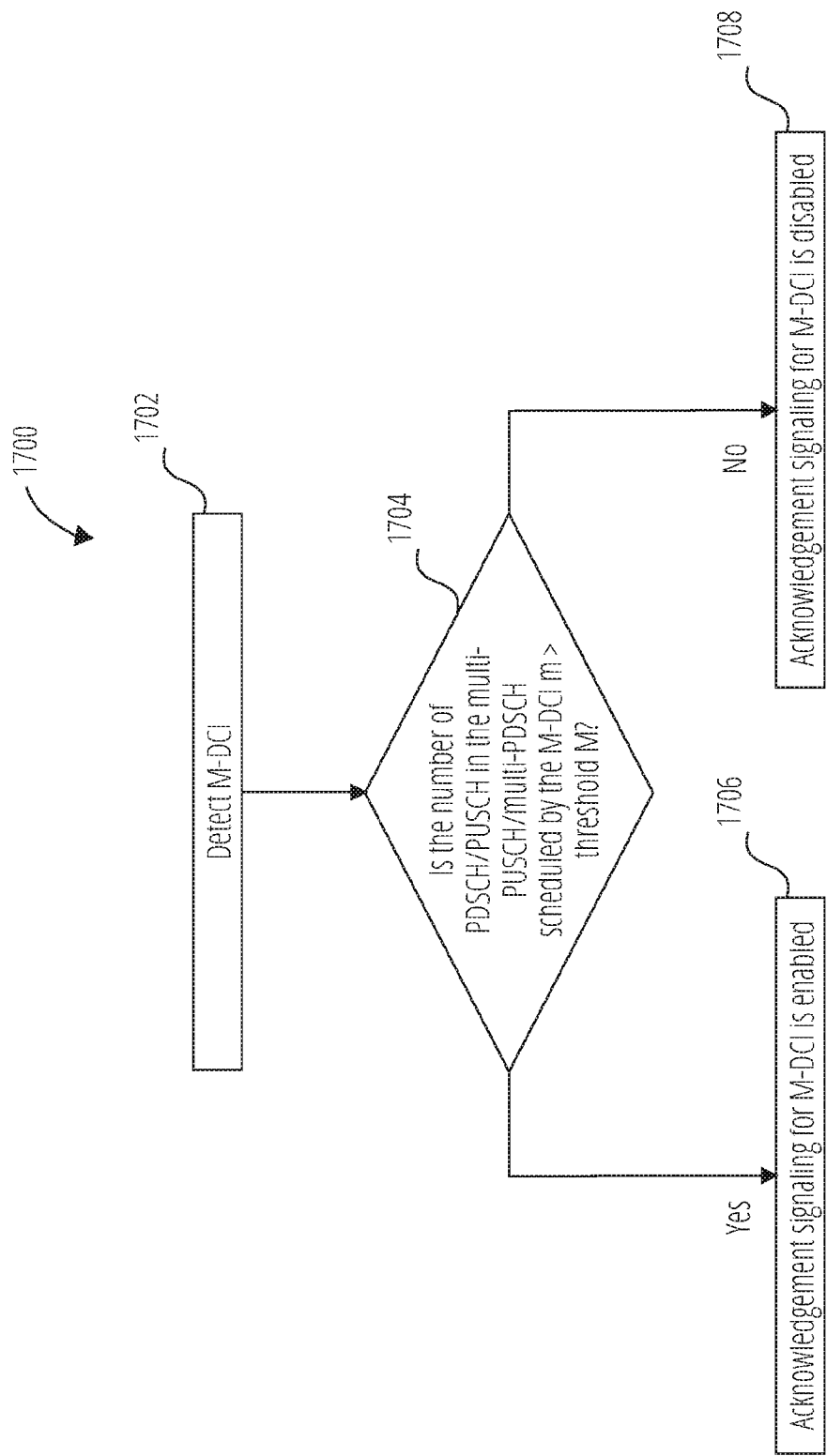
FIG. 17 illustrates a method of a UE, according to an embodiment.

FIG. 17 illustrates a method 1700 of a UE, according to an embodiment. The method 1700 includes detecting 1702 M-DCI.

The method 1700 further includes determining 1704 whether the number of PDSCH/PUSCH in the multi-PUSCH/multi-PDSCH scheduled by the M-DCI (denoted m in determining 1704) is greater than a threshold A (as described above).

If so, the method 1700 proceeds to enabling 1706 acknowledgement signaling methods for the M-DCI. If not, the method 1700 instead proceeds to disabling 1708 acknowledgement signaling methods for the M-DCI.

Figure 18:
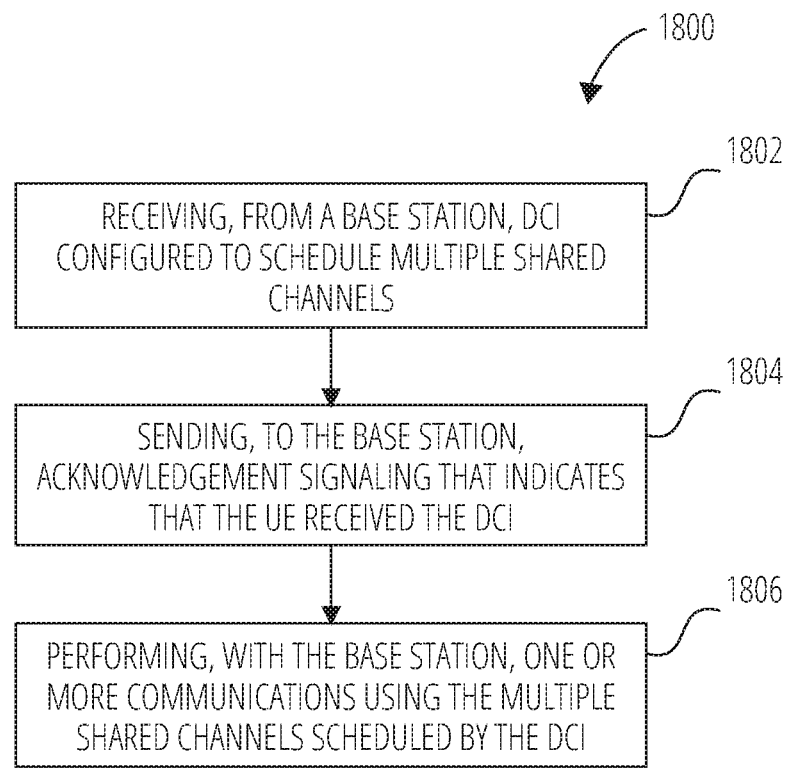
FIG. 18 illustrates a method of a UE, according to an embodiment.

FIG. 18 illustrates a method 1800 of a UE, according to an embodiment. The method 1800 includes receiving 1802, from a base station, DCI configured to schedule multiple shared channels.

The method 1800 further includes sending 1804, to the base station, acknowledgement signaling that indicates that the UE received the DCI.

The method 1800 further includes performing 1806, with the base station, one or more communications using the multiple shared channels scheduled by the DCI.

The method 1800 may represent example 1 of the method 1800.

In example 2 of the method 1800, which is according to example 1 of the method 1800, the multiple shared channels comprise one of multi-PUSCH and multi-PDSCH.

In example 3 of the method 1800, which is according to example 1 of the method 1800, the acknowledgement signaling is sent using a HARQ-ACK bit at least a pre-determined number of symbols after a last symbol of a PDCCH comprising the DCI.

In example 4 of the method 1800, which is according to example 3 of the method 1800, the pre-determined number of symbols is determined based on an SCS of the PDCCH.

In example 5 of the method 1800, which is according to example 3 of the method 1800, the HARQ-ACK bit is sent in a first slot that is within a pre-determined number of slots after a slot of the PDCCH, and the first slot occurs after the pre-determined number of symbols.

In example 6 of the method 1800, which is according to example 5 of the method 1800, the pre-determined number of slots is one of a set of values configured by RRC signaling, and the DCI indicates the one of the set of values.

In example 7 of the method 1800, which is according to example 5 of the method 1800, the pre-determined number of slots is pre-configured at the UE.

In example 8 of the method 1800, which is according to example 1 of the method 1800, the acknowledgement signaling is sent in a HARQ-ACK codebook.

In example 9 of the method 1800, which is according to example 8 of the method 1800, the DCI comprises a first DCI received at the UE during a first MO and a second DCI received at the UE during a second MO, and the acknowledgement signaling comprises a first bit representing that the first DCI was received during the first MO and a second bit representing the second DCI was received during the second MO.

In example 10 of the method 1800, which is according to example 8 of the method 1800, the DCI is received at the UE during a first MO, the acknowledgement signaling comprises a first bit representing that the DCI was received during the first MO, and the acknowledgement signaling comprises a second bit representing that no DCI was received during a second MO.

In example 11 of the method 1800, which is according to example 8 of the method 1800, the DCI comprises a first DCI received during a first MO on a first CC of a plurality of CC and a second DCI received during a second MO on a second CC of the plurality of CC, and the acknowledgement signaling comprises a first bit indicating that the first DCI was received during the first MO and a second bit indicating that the second DCI was received during the second MO.

In example 12 of the method 1800, which is according to example 11 of the method 1800, the acknowledgement signaling comprises a third bit indicating that no DCI was received during a third MO.

In example 13 of the method 1800, which is according to example 13 of the method 1800, the first bit is ordered in the HARQ-ACK codebook according to an order of the first CC relative to the second CC, and the second bit is ordered in the HARQ-ACK codebook according to an order of the second CC relative to the first CC.

In example 14 of the method 1800, which is according to example 11 of the method 1800, the first MO occurs during a first slot and the second MO occurs during a second slot, the first bit is ordered in the HARQ-ACK codebook according to a time of the first slot relative to the second slot, and the second bit is ordered in the HARQ-ACK codebook according to a time of the second slot relative to the first slot.

In example 15 of the method 1800, which is according to example 11 of the method 1800, the first DCI indicates an accumulative number of MO on which the DCI is sent by the base station on the plurality of CC prior to a time of a slot during which the first DCI is received and through the plurality of CC on the slot during which the first DCI is received until the first MO.

In example 16 of the method 1800, which is according to example 11 of the method 1800, the first DCI indicates a total number of MO on which the DCI is sent by the base station on the plurality of CC by a time of a slot during which the first DCI is received.

In example 17 of the method 1800, which is according to example 8 of the method 1800, the HARQ-ACK codebook is sent in response to a receipt from the base station of a triggering DCI that indicates that the acknowledgement signaling should be sent by the UE.

In example 18 of the method 1800, which is according to example 17 of the method 1800, the DCI is received during a monitoring window defined relative to a PUCCH triggered by the triggering DCI.

In example 19 of the method 1800, which is according to example 18 of the method 1800, a size of the monitoring window is configured by radio resource control (RRC) signaling.

In example 20 of the method 1800, which is according to example 18 of the method 1800, a size of the monitoring window is indicated by one of MAC-CE signaling and the triggering DCI.

In example 21 of the method 1800, which is according to example 17 of the method 1800, the DCI comprises a first DCI received on a first CC of a plurality of CC during a first monitoring window for the first CC defined relative to a PUCCH triggered by the triggering DCI, and a second DCI received on a second CC of the plurality of CC during a second monitoring window for the second CC defined relative to the PUCCH.

In example 22 of the method 1800, which is according to example 17 of the method 1800, the UE determines that the triggering DCI indicates that the acknowledgement signaling should be sent by the UE according to a HR field in a block of the triggering DCI that corresponds to the UE.

In example 23 of the method 1800, which is according to example 17 of the method 1800, the UE determines that the triggering DCI comprises a block that corresponds to the UE by scrambling a CRC field of the triggering DCI with a HR-RNTI provided to the UE by the base station.

In example 24 of the method 1800, which is according to example 8 of the method 1800, the HARQ-ACK codebook is concatenated with a HARQ-ACK codebook for a previous PDSCH received from the base station.

In example 25 of the method 1800, which is according to example 1 of the method 1800, the acknowledgement signaling comprises an A-SRS.

In example 26 of the method 1800, which is according to example 1 of the method 1800, the DCI comprises a first DCI received on a first CC of a plurality of CC and a second DCI received on a second CC of the plurality of CC, and the acknowledgement signaling comprises a first A-SRS corresponding to the first DCI on the first CC and a second A-SRS corresponding to the second DCI on the second CC.

In example 27 of the method 1800, which is according to example 1 of the method 1800, the DCI is received on a first CC, and the acknowledgement signaling comprises a first A-SRS corresponding to the DCI on a second CC.

In example 28 of the method 1800, which is according to example 1 of the method 1800, the multiple shared channels are divided into at least a first subgroup and a second subgroup, the first subgroup occurring before the second subgroup.

In example 29 of the method 1800, which is according to example 28 of the method 1800, the first subgroup comprises one or more PUSCH, and the one or more PUSCH comprises the acknowledgement signaling.

In example 29 of the method 1800, which is according to example 28 of the method 1800, the first subgroup comprises first one or more PDSCH, and the acknowledgement signaling is sent on a PUCCH after the first subgroup and before the second subgroup.

Embodiments contemplated herein include an apparatus comprising means to perform one or more elements of the method 1800. This apparatus may be, for example, an apparatus of a UE (such as a wireless device 2302 that is a UE, as described herein).

Embodiments contemplated herein include one or more non-transitory computer-readable media comprising instructions to cause an electronic device, upon execution of the instructions by one or more processors of the electronic device, to perform one or more elements of the method 1800. This non-transitory computer-readable media may be, for example, a memory of a UE (such as a memory 2306 of a wireless device 2302 that is a UE, as described herein).

Embodiments contemplated herein include an apparatus comprising logic, modules, or circuitry to perform one or more elements of the method 1800. This apparatus may be, for example, an apparatus of a UE (such as a wireless device 2302 that is a UE, as described herein).

Embodiments contemplated herein include an apparatus comprising: one or more processors and one or more computer-readable media comprising instructions that, when executed by the one or more processors, cause the one or more processors to perform one or more elements of the method 1800. This apparatus may be, for example, an apparatus of a UE (such as a wireless device 2302 that is a UE, as described herein).

Embodiments contemplated herein include a signal as described in or related to one or more elements of the method 1800.

Embodiments contemplated herein include a computer program or computer program product comprising instructions, wherein execution of the program by a processor is to cause the processor to carry out one or more elements of the method 1800. The processor may be a processor of a UE (such as a processor(s) 2304 of a wireless device 2302 that is a UE, as described herein). These instructions may be, for example, located in the processor and/or on a memory of the UE (such as a memory 2306 of a wireless device 2302 that is a UE, as described herein).

Figure 19:
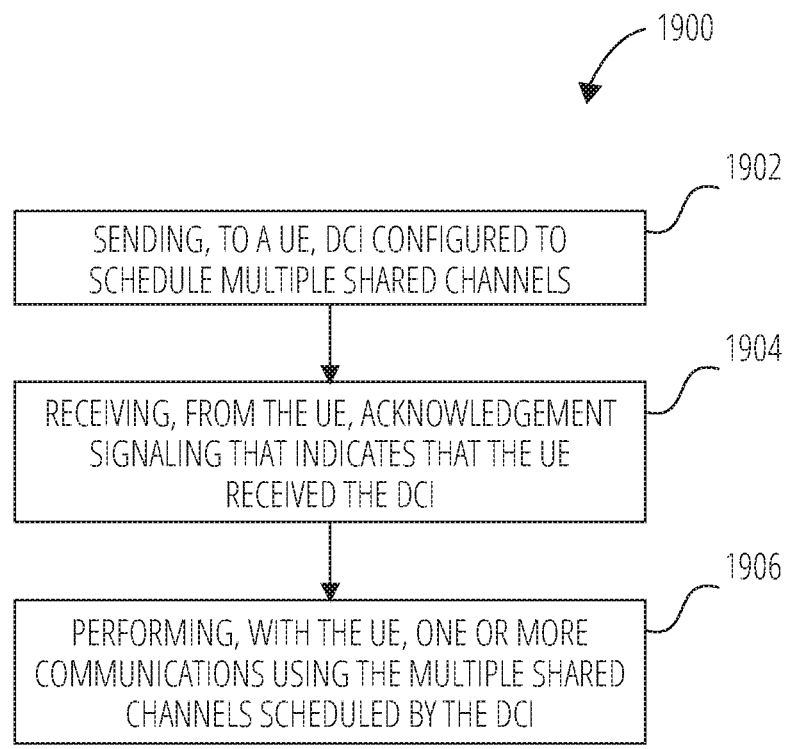
FIG. 19 illustrates a method of a base station, according to an embodiment.

FIG. 19 illustrates a method 1900 of a base station, according to an embodiment. The method 1900 includes sending 1902, to a UE, DCI configured to schedule multiple shared channels.

The method 1900 further includes receiving 1904, from the UE, acknowledgement signaling that indicates that the UE received the DCI.

The method 1900 further includes performing 1906, with the UE, one or more communications using the multiple shared channels scheduled by the DCI.

In some embodiments of the method 1900, the multiple shared channels comprise one of multiple physical uplink shared channels (multi-PUSCH) and multiple physical downlink shared channels (multi-PDSCH).

In some embodiments of the method 1900, the acknowledgement signaling is sent in a hybrid automatic repeat request (HARQ) acknowledgement (HARQ-ACK) codebook.

In some embodiments of the method 1900, the acknowledgement signaling comprises an aperiodic sounding reference signal (A-SRS).

Embodiments contemplated herein include an apparatus comprising means to perform one or more elements of the method 1900. This apparatus may be, for example, an apparatus of a base station (such as a network device 2318 that is a base station, as described herein).

Embodiments contemplated herein include one or more non-transitory computer-readable media comprising instructions to cause an electronic device, upon execution of the instructions by one or more processors of the electronic device, to perform one or more elements of the method 1900. This non-transitory computer-readable media may be, for example, a memory of a base station (such as a memory 2322 of a network device 2318 that is a base station, as described herein).

Embodiments contemplated herein include an apparatus comprising logic, modules, or circuitry to perform one or more elements of the method 1900. This apparatus may be, for example, an apparatus of a base station (such as a network device 2318 that is a base station, as described herein).

Embodiments contemplated herein include an apparatus comprising: one or more processors and one or more computer-readable media comprising instructions that, when executed by the one or more processors, cause the one or more processors to perform one or more elements of the method 1900. This apparatus may be, for example, an apparatus of a base station (such as a network device 2318 that is a base station, as described herein).

Embodiments contemplated herein include a signal as described in or related to one or more elements of the method 1900.

Embodiments contemplated herein include a computer program or computer program product comprising instructions, wherein execution of the program by a processing element is to cause the processing element to carry out one or more elements of the method 1900. The processor may be a processor of a base station (such as a processor(s) 2320 of a network device 2318 that is a base station, as described herein). These instructions may be, for example, located in the processor and/or on a memory of the base station (such as a memory 2322 of a network device 2318 that is a base station, as described herein).

Figure 20:
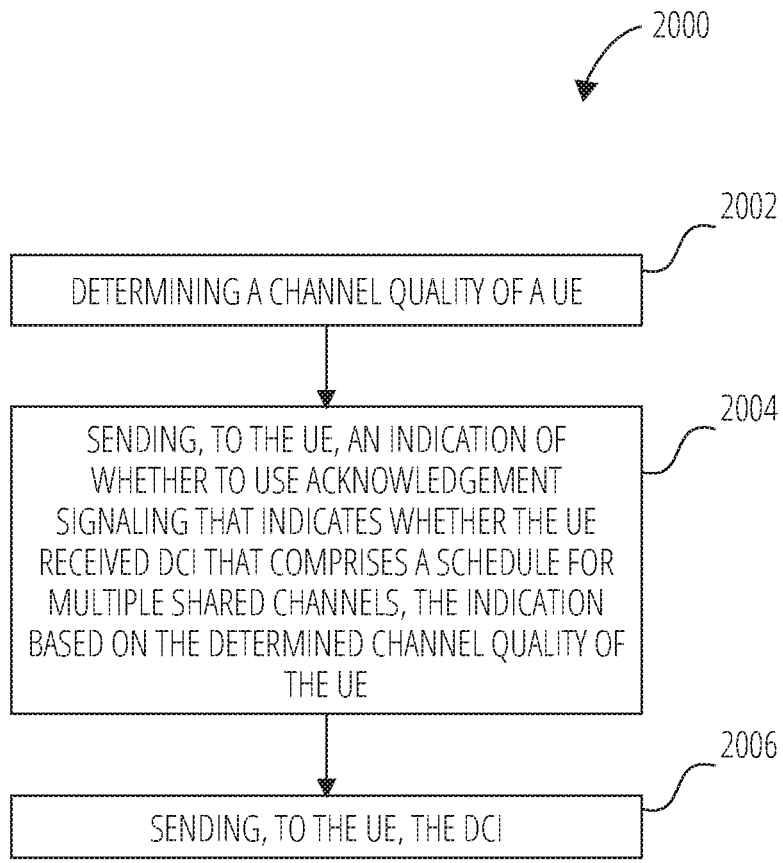
FIG. 20 illustrates a method of a base station, according to an embodiment.

FIG. 20 illustrates a method 2000 of a base station, according to an embodiment. The method 2000 includes determining 2002 a channel quality of a UE.

The method 2000 further includes sending 2004, to the UE, an indication of whether to use acknowledgement signaling that indicates whether the UE received DCI that comprises a schedule for multiple shared channels, the indication based on the determined channel quality of the UE.

The method 2000 further includes sending 2006, to the UE, the DCI.

Embodiments contemplated herein include an apparatus comprising means to perform one or more elements of the method 2000. This apparatus may be, for example, an apparatus of a base station (such as a network device 2318 that is a base station, as described herein).

Embodiments contemplated herein include one or more non-transitory computer-readable media comprising instructions to cause an electronic device, upon execution of the instructions by one or more processors of the electronic device, to perform one or more elements of the method 2000. This non-transitory computer-readable media may be, for example, a memory of a base station (such as a memory 2322 of a network device 2318 that is a base station, as described herein).

Embodiments contemplated herein include an apparatus comprising logic, modules, or circuitry to perform one or more elements of the method 2000. This apparatus may be, for example, an apparatus of a base station (such as a network device 2318 that is a base station, as described herein).

Embodiments contemplated herein include an apparatus comprising: one or more processors and one or more computer-readable media comprising instructions that, when executed by the one or more processors, cause the one or more processors to perform one or more elements of the method 2000. This apparatus may be, for example, an apparatus of a base station (such as a network device 2318 that is a base station, as described herein).

Embodiments contemplated herein include a signal as described in or related to one or more elements of the method 2000.

Embodiments contemplated herein include a computer program or computer program product comprising instructions, wherein execution of the program by a processing element is to cause the processing element to carry out one or more elements of the method 2000. The processor may be a processor of a base station (such as a processor(s) 2320 of a network device 2318 that is a base station, as described herein). These instructions may be, for example, located in the processor and/or on a memory of the base station (such as a memory 2322 of a network device 2318 that is a base station, as described herein).

Figure 21:
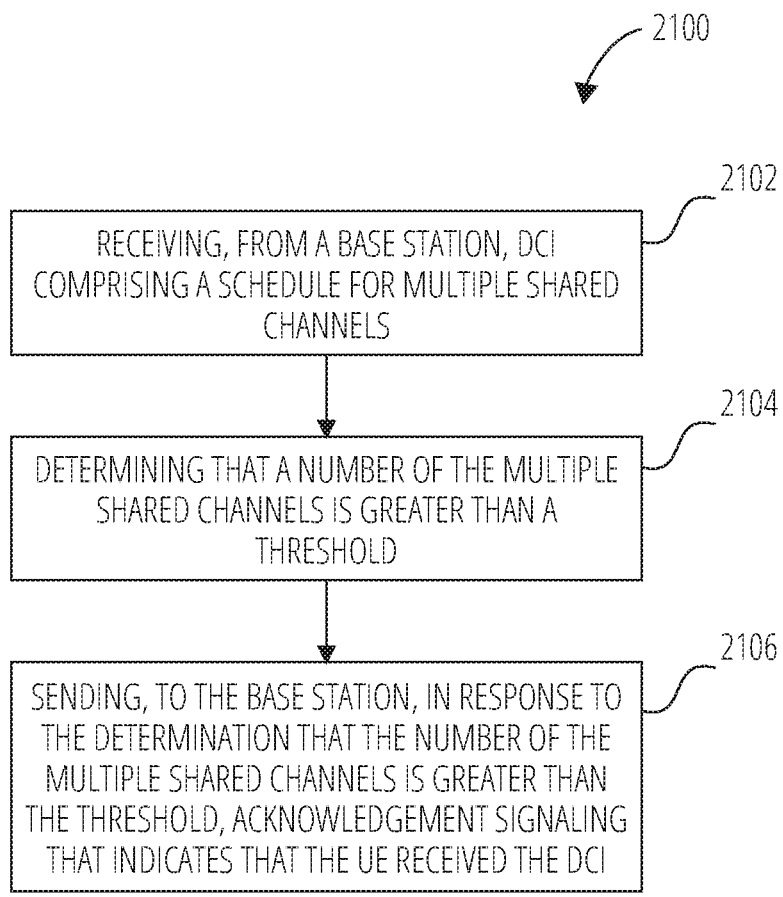
FIG. 21 illustrates a method of a UE, according to an embodiment.

FIG. 21 illustrates a method 2100 of a UE, according to an embodiment. The method 2100 includes receiving 2102, from a base station, DCI comprising a schedule for multiple shared channels.

The method 2100 further includes determining 2104 that a number of the multiple shared channels is greater than a threshold.

The method 2100 further includes sending 2106, to the base station, in response to the determination that the number of the multiple shared channels is greater than the threshold, acknowledgement signaling that indicates that the UE received the DCI.

In some embodiments of the method 2100, the threshold is configured to the UE by the base station.

Embodiments contemplated herein include an apparatus comprising means to perform one or more elements of the method 2100. This apparatus may be, for example, an apparatus of a UE (such as a wireless device 2302 that is a UE, as described herein).

Embodiments contemplated herein include one or more non-transitory computer-readable media comprising instructions to cause an electronic device, upon execution of the instructions by one or more processors of the electronic device, to perform one or more elements of the method 2100. This non-transitory computer-readable media may be, for example, a memory of a UE (such as a memory 2306 of a wireless device 2302 that is a UE, as described herein).

Embodiments contemplated herein include an apparatus comprising logic, modules, or circuitry to perform one or more elements of the method 2100. This apparatus may be, for example, an apparatus of a UE (such as a wireless device 2302 that is a UE, as described herein).

Embodiments contemplated herein include an apparatus comprising: one or more processors and one or more computer-readable media comprising instructions that, when executed by the one or more processors, cause the one or more processors to perform one or more elements of the method 2100. This apparatus may be, for example, an apparatus of a UE (such as a wireless device 2302 that is a UE, as described herein).

Embodiments contemplated herein include a signal as described in or related to one or more elements of the method 2100.

Embodiments contemplated herein include a computer program or computer program product comprising instructions, wherein execution of the program by a processor is to cause the processor to carry out one or more elements of the method 2100. The processor may be a processor of a UE (such as a processor(s) 2304 of a wireless device 2302 that is a UE, as described herein). These instructions may be, for example, located in the processor and/or on a memory of the UE (such as a memory 2306 of a wireless device 2302 that is a UE, as described herein).

Figure 22:
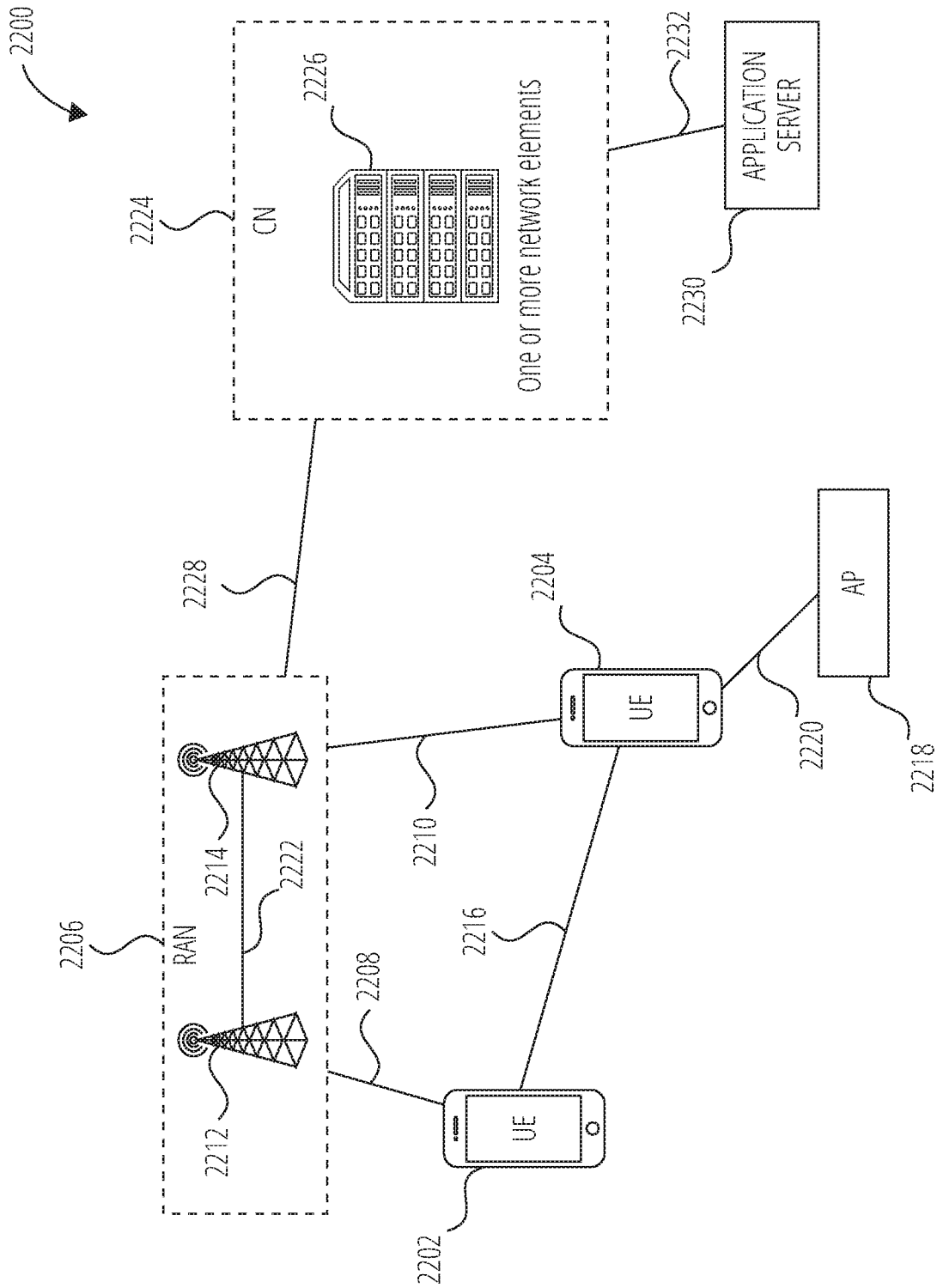
FIG. 22 illustrates an example architecture of a wireless communication system, according to embodiments disclosed herein.

FIG. 22 illustrates an example architecture of a wireless communication system 2200, according to embodiments disclosed herein. The following description is provided for an example wireless communication system 2200 that operates in conjunction with the LTE system standards and/or 5G or NR system standards as provided by 3GPP technical specifications.

As shown by FIG. 22, the wireless communication system 2200 includes UE 2202 and UE 2204 (although any number of UEs may be used). In this example, the UE 2202 and the UE 2204 are illustrated as smartphones (e.g., handheld touchscreen mobile computing devices connectable to one or more cellular networks), but may also comprise any mobile or non-mobile computing device configured for wireless communication.

The UE 2202 and UE 2204 may be configured to communicatively couple with a RAN 2206. In embodiments, the RAN 2206 may be NG-RAN, E-UTRAN, etc. The UE 2202 and UE 2204 utilize connections (or channels) (shown as connection 2208 and connection 2210, respectively) with the RAN 2206, each of which comprises a physical communications interface. The RAN 2206 can include one or more base stations, such as base station 2212 and base station 2214, that enable the connection 2208 and connection 2210.

In this example, the connection 2208 and connection 2210 are air interfaces to enable such communicative coupling, and may be consistent with RAT(s) used by the RAN 2206, such as, for example, an LTE and/or NR.

In some embodiments, the UE 2202 and UE 2204 may also directly exchange communication data via a sidelink interface 2216. The UE 2204 is shown to be configured to access an access point (shown as AP 2218) via connection 2220. By way of example, the connection 2220 can comprise a local wireless connection, such as a connection consistent with any IEEE 802.11 protocol, wherein the AP 2218 may comprise a Wi-Fi® router. In this example, the AP 2218 may be connected to another network (for example, the Internet) without going through a CN 2224.

In embodiments, the UE 2202 and UE 2204 can be configured to communicate using orthogonal frequency division multiplexing (OFDM) communication signals with each other or with the base station 2212 and/or the base station 2214 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 2212 or base station 2214 may be implemented as one or more software entities running on server computers as part of a virtual network. In addition, or in other embodiments, the base station 2212 or base station 2214 may be configured to communicate with one another via interface 2222. In embodiments where the wireless communication system 2200 is an LTE system (e.g., when the CN 2224 is an EPC), the interface 2222 may be an X2 interface. The X2 interface may be defined between two or more base stations (e.g., two or more eNBs and the like) that connect to an EPC, and/or between two eNBs connecting to the EPC. In embodiments where the wireless communication system 2200 is an NR system (e.g., when CN 2224 is a 5GC), the interface 2222 may be an Xn interface. The Xn interface is defined between two or more base stations (e.g., two or more gNBs and the like) that connect to 5GC, between a base station 2212 (e.g., a gNB) connecting to 5GC and an eNB, and/or between two eNBs connecting to 5GC (e.g., CN 2224).

The RAN 2206 is shown to be communicatively coupled to the CN 2224. The CN 2224 may comprise one or more network elements 2226, which are configured to offer various data and telecommunications services to customers/subscribers (e.g., users of UE 2202 and UE 2204) who are connected to the CN 2224 via the RAN 2206. The components of the CN 2224 may be implemented in one physical device or separate physical devices including components to read and execute instructions from a machine-readable or computer-readable medium (e.g., a non-transitory machine-readable storage medium).

In embodiments, the CN 2224 may be an EPC, and the RAN 2206 may be connected with the CN 2224 via an S1 interface 2228. In embodiments, the S1 interface 2228 may be split into two parts, an S1 user plane (S1-U) interface, which carries traffic data between the base station 2212 or base station 2214 and a serving gateway (S-GW), and the S1-MME interface, which is a signaling interface between the base station 2212 or base station 2214 and mobility management entities (MMEs).

In embodiments, the CN 2224 may be a 5GC, and the RAN 2206 may be connected with the CN 2224 via an NG interface 2228. In embodiments, the NG interface 2228 may be split into two parts, an NG user plane (NG-U) interface, which carries traffic data between the base station 2212 or base station 2214 and a user plane function (UPF), and the S1 control plane (NG-C) interface, which is a signaling interface between the base station 2212 or base station 2214 and access and mobility management functions (AMFs).

Generally, an application server 2230 may be an element offering applications that use internet protocol (IP) bearer resources with the CN 2224 (e.g., packet switched data services). The application server 2230 can also be configured to support one or more communication services (e.g., VoIP sessions, group communication sessions, etc.) for the UE 2202 and UE 2204 via the CN 2224. The application server 2230 may communicate with the CN 2224 through an IP communications interface 2232.

Figure 23:
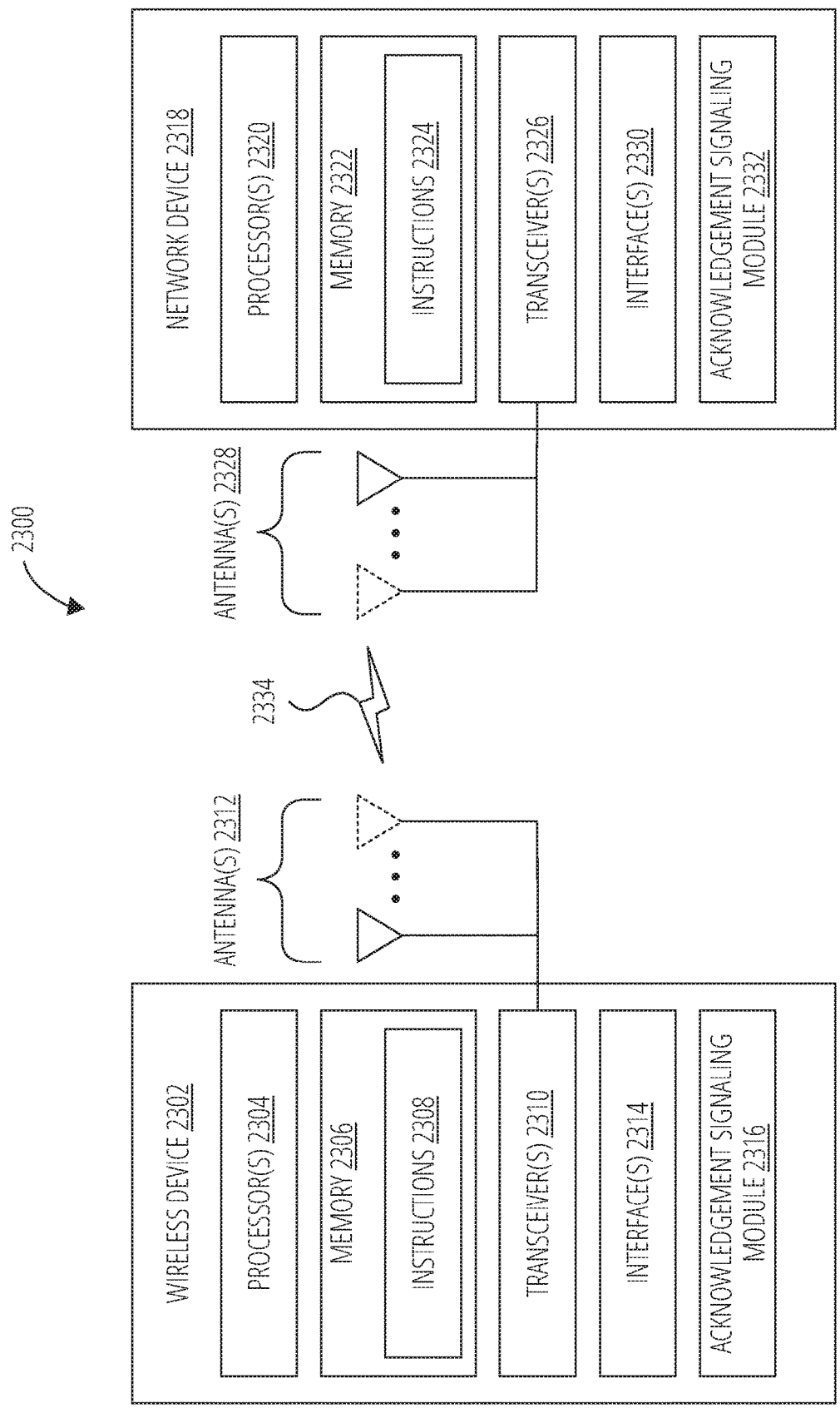
FIG. 23 illustrates a system for performing signaling between a wireless device and a network device, according to embodiments disclosed herein.

FIG. 23 illustrates a system 2300 for performing signaling 2334 between a wireless device 2302 and a network device 2318, according to embodiments disclosed herein. The system 2300 may be a portion of a wireless communications system as herein described. The wireless device 2302 may be, for example, a UE of a wireless communication system. The network device 2318 may be, for example, a base station (e.g., an eNB or a gNB) of a wireless communication system.

The wireless device 2302 may include one or more processor(s) 2304. The processor(s) 2304 may execute instructions such that various operations of the wireless device 2302 are performed, as described herein. The processor(s) 2304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 2302 may include a memory 2306. The memory 2306 may be a non-transitory computer-readable storage medium that stores instructions 2308 (which may include, for example, the instructions being executed by the processor(s) 2304). The instructions 2308 may also be referred to as program code or a computer program. The memory 2306 may also store data used by, and results computed by, the processor(s) 2304.

The wireless device 2302 may include one or more transceiver(s) 2310 that may include radio frequency (RF) transmitter and/or receiver circuitry that use the antenna(s) 2312 of the wireless device 2302 to facilitate signaling (e.g., the signaling 2334) to and/or from the wireless device 2302 with other devices (e.g., the network device 2318) according to corresponding RATs.

The wireless device 2302 may include one or more antenna(s) 2312 (e.g., one, two, four, or more). For embodiments with multiple antenna(s) 2312, the wireless device 2302 may leverage the spatial diversity of such multiple antenna(s) 2312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 2302 may be accomplished according to precoding (or digital beamforming) that is applied at the wireless device 2302 that multiplexes the data streams across the antenna(s) 2312 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 2302 may implement analog beamforming techniques, whereby phases of the signals sent by the antenna(s) 2312 are relatively adjusted such that the (joint) transmission of the antenna(s) 2312 can be directed (this is sometimes referred to as beam steering).

The wireless device 2302 may include one or more interface(s) 2314. The interface(s) 2314 may be used to provide input to or output from the wireless device 2302. For example, a wireless device 2302 that is a UE may include interface(s) 2314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 2310/antenna(s) 2312 already described) that allow for communication between the UE and other devices and may operate according to known protocols (e.g., Wi-Fi®, Bluetooth®, and the like).

The wireless device 2302 may include an acknowledgement signaling module 2316. The acknowledgement signaling module 2316 may be implemented via hardware, software, or combinations thereof. For example, the acknowledgement signaling module 2316 may be implemented as a processor, circuit, and/or instructions 2308 stored in the memory 2306 and executed by the processor(s) 2304. In some examples, the acknowledgement signaling module 2316 may be integrated within the processor(s) 2304 and/or the transceiver(s) 2310. For example, the acknowledgement signaling module 2316 may be implemented by a combination of software components (e.g., executed by a DSP or a general processor) and hardware components (e.g., logic gates and circuitry) within the processor(s) 2304 or the transceiver(s) 2310.

The acknowledgement signaling module 2316 may be used for various aspects of the present disclosure, for example, aspects of FIG. 2 through FIG. 12, FIG. 14 through FIG. 18 and FIG. 21. The acknowledgement signaling module 2316 is configured to encode and send acknowledgement signaling to a base station, as described herein.

The network device 2318 may include one or more processor(s) 2320. The processor(s) 2320 may execute instructions such that various operations of the network device 2318 are performed, as described herein. The processor(s) 2304 may include one or more baseband processors implemented using, for example, a CPU, a DSP, an ASIC, a controller, an FPGA device, another hardware device, a firmware device, or any combination thereof configured to perform the operations described herein.

The network device 2318 may include a memory 2322. The memory 2322 may be a non-transitory computer-readable storage medium that stores instructions 2324 (which may include, for example, the instructions being executed by the processor(s) 2320). The instructions 2324 may also be referred to as program code or a computer program. The memory 2322 may also store data used by, and results computed by, the processor(s) 2320.

The network device 2318 may include one or more transceiver(s) 2326 that may include RF transmitter and/or receiver circuitry that use the antenna(s) 2328 of the network device 2318 to facilitate signaling (e.g., the signaling 2334) to and/or from the network device 2318 with other devices (e.g., the wireless device 2302) according to corresponding RATs.

The network device 2318 may include one or more antenna(s) 2328 (e.g., one, two, four, or more). In embodiments having multiple antenna(s) 2328, the network device 2318 may perform MIMO, digital beamforming, analog beamforming, beam steering, etc., as has been described.

The network device 2318 may include one or more interface(s) 2330. The interface(s) 2330 may be used to provide input to or output from the network device 2318. For example, a network device 2318 that is a base station may include interface(s) 2330 made up of transmitters, receivers, and other circuitry (e.g., other than the transceiver(s) 2326/antenna(s) 2328 already described) that enables the base station to communicate with other equipment in a core network, and/or that enables the base station to communicate with external networks, computers, databases, and the like for purposes of operations, administration, and maintenance of the base station or other equipment operably connected thereto.

The network device 2318 may include an acknowledgement signaling module 2332. The acknowledgement signaling module 2332 may be implemented via hardware, software, or combinations thereof. For example, the acknowledgement signaling module 2332 may be implemented as a processor, circuit, and/or instructions 2324 stored in the memory 2322 and executed by the processor(s) 2320. In some examples, the acknowledgement signaling module 2332 may be integrated within the processor(s) 2320 and/or the transceiver(s) 2326. For example, the acknowledgement signaling module 2332 may be implemented by a combination of software components (e.g., executed by a DSP or a general processor) and hardware components (e.g., logic gates and circuitry) within the processor(s) 2320 or the transceiver(s) 2326.

The acknowledgement signaling module 2332 may be used for various aspects of the present disclosure, for example, aspects of FIG. 1 through FIG. 5, FIG. 7 through FIG. 13, FIG. 15, FIG. 16, FIG. 19 and FIG. 20. The acknowledgement signaling module 2332 is configured to receive and decode acknowledgement signaling received from a UE, as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
receiving, from a base station, downlink control information (DCI) configured to schedule multiple shared channels;
sending, to the base station, acknowledgement signaling that indicates that the UE received the DCI, wherein the acknowledgement signaling is sent using a hybrid automatic repeat request (HARQ) acknowledgement (HARQ-ACK) bit at least a pre-determined number of symbols after a last symbol of a physical downlink control channel (PDCCH) comprising the DCI; and
performing, with the base station, one or more communications using the multiple shared channels scheduled by the DCI.

2. The method of claim 1, wherein the multiple shared channels comprise one of multiple physical uplink shared channels (multi-PUSCH) and multiple physical downlink shared channels (multi-PDSCH).

3. The method of claim 1, wherein the pre-determined number of symbols is determined based on a subcarrier spacing (SCS) of the PDCCH.

4. The method of claim 1, wherein:
the HARQ-ACK bit is sent in a first slot that occurs a number of slots after a slot of the PDCCH; and
the first slot occurs after the pre-determined number of symbols.

5. The method of claim 4, wherein:
the number of slots is one of a set of values configured by radio resource control (RRC) signaling; and
the DCI indicates the one of the set of values.

6. The method of claim 4, wherein the number of slots is pre-configured at the UE.

7. The method of claim 1, wherein the acknowledgement signaling is sent in a hybrid automatic repeat request (HARQ) acknowledgement (HARQ-ACK) codebook.

8. The method of claim 7, wherein:
the DCI comprises a first DCI received at the UE during a first monitoring occasion (MO) and a second DCI received at the UE during a second MO; and
the acknowledgement signaling comprises a first bit representing that the first DCI was received during the first MO and a second bit representing the second DCI was received during the second MO.

9. The method of claim 7, wherein:
the DCI is received at the UE during a first monitoring occasion (MO);
the acknowledgement signaling comprises a first bit representing that the DCI was received during the first MO, and;
the acknowledgement signaling comprises a second bit representing that no DCI was received during a second MO.

10. The method of claim 7, wherein:
the DCI comprises a first DCI received during a first MO on a first component carrier (CC) of a plurality of CC and a second DCI received during a second MO on a second CC of the plurality of CC; and
the acknowledgement signaling comprises a first bit indicating that the first DCI was received during the first MO and a second bit indicating that the second DCI was received during the second MO.

11. The method of claim 10, wherein the acknowledgement signaling comprises a third bit indicating that no DCI was received during a third MO.

12. The method of claim 10, wherein:
the first bit is ordered in the HARQ-ACK codebook according to an order of the first CC relative to the second CC; and
the second bit is ordered in the HARQ-ACK codebook according to an order of the second CC relative to the first CC.

13. The method of claim 10, wherein:
the first MO occurs during a first slot and the second MO occurs during a second slot;
the first bit is ordered in the HARQ-ACK codebook according to a time of the first slot relative to the second slot; and
the second bit is ordered in the HARQ-ACK codebook according to a time of the second slot relative to the first slot.

14. The method of claim 10, wherein the first DCI indicates an accumulative number of MO on which the DCI is sent by the base station on the plurality of CC prior to a time of a slot during which the first DCI is received and through the plurality of CC on the slot during which the first DCI is received until the first MO.

15. The method of claim 10, wherein the first DCI indicates a total number of MO on which the DCI is sent by the base station on the plurality of CC by a time of a slot during which the first DCI is received.

16. The method of claim 7, wherein the HARQ-ACK codebook is sent in response to a receipt from the base station of a triggering DCI that indicates that the acknowledgement signaling is to be sent by the UE.

17. The method of claim 16, wherein the DCI is received during a monitoring window defined relative to a physical uplink control channel (PUCCH) triggered by the triggering DCI.

18. The method of claim 17, wherein a size of the monitoring window is configured by radio resource control (RRC) signaling.

19. The method of claim 17, wherein a size of the monitoring window is indicated by one of medium access control (MAC) control element (CE) (MAC-CE) signaling and the triggering DCI.

* * * * *